(12) United States Patent
Gupta et al.

(10) Patent No.: US 12,096,252 B2
(45) Date of Patent: Sep. 17, 2024

(54) MITIGATION OF RADIO FREQUENCY (RF) OUTAGES ON A WIRELESS NETWORK

(71) Applicant: HEWLETT PACKARD ENTERPRISE DEVELOPMENT LP, Houston, TX (US)

(72) Inventors: Rishabh Gupta, Santa Clara, CA (US); Shubham Saloni, Santa Clara, CA (US); Nethra Muniyappa, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 152 days.

(21) Appl. No.: 17/533,634

(22) Filed: Nov. 23, 2021

(65) Prior Publication Data

US 2023/0164595 A1    May 25, 2023

(51) Int. Cl.
*H04W 24/04* (2009.01)
*H04W 16/18* (2009.01)
*H04W 24/02* (2009.01)

(52) U.S. Cl.
CPC ........... *H04W 24/04* (2013.01); *H04W 16/18* (2013.01); *H04W 24/02* (2013.01)

(58) Field of Classification Search
CPC ...... H04W 24/04; H04W 16/18; H04W 24/02
See application file for complete search history.

(56) References Cited

U.S. PATENT DOCUMENTS

| 8,195,478 | B2 | 6/2012 | Petersen et al. | |
|---|---|---|---|---|
| 8,824,323 | B2 | 9/2014 | Stanislaus et al. | |
| 8,830,913 | B1 * | 9/2014 | Sosa | H04W 4/50 |
| | | | | 455/418 |
| 9,161,239 | B2 * | 10/2015 | Mercier | H04W 24/02 |
| 9,332,497 | B2 | 5/2016 | Bhanage et al. | |
| 9,699,601 | B2 | 7/2017 | Grayson et al. | |
| 9,888,387 | B2 * | 2/2018 | Chen | H04W 60/005 |
| 9,894,604 | B1 * | 2/2018 | Tran | H04W 48/20 |
| 10,397,928 | B1 | 8/2019 | Hahn et al. | |
| 2008/0084855 | A1 * | 4/2008 | Rahman | H04W 24/04 |
| | | | | 370/342 |

(Continued)

FOREIGN PATENT DOCUMENTS

WO    2014/027829 A1    2/2014

*Primary Examiner* — Christopher M Crutchfield
*Assistant Examiner* — Tito Q Pham
(74) *Attorney, Agent, or Firm* — Sheppard Mullin Richter & Hampton LLP

(57) ABSTRACT

A set of AP radios to which configurations are to be deployed is identified. A candidate deployment order for deploying configurations to the set of AP radios is determined by an order-deploy algorithm. The algorithm seeks to spread out configuration deployments to AP radios both spatially and temporally such that APs that are located close to one another in the network receive their configuration updates as part of different deployment batches with delay periods introduced between consecutive batch deployments. The algorithm orders the set of APs by iterating through a network factor hierarchy to place APs that share certain network factors such as the same band or channel close to one another in the candidate deployment order and place APs that share certain other network factors (e.g., same switch, RF domain, and/or RF partition) far from one another in the order.

20 Claims, 10 Drawing Sheets

(56) References Cited

U.S. PATENT DOCUMENTS

| | | |
|---|---|---|
| 2009/0094351 A1* | 4/2009 | Gupta .................. H04L 63/104 |
| | | 726/3 |
| 2010/0246416 A1 | 9/2010 | Sinha et al. |
| 2011/0170424 A1 | 7/2011 | Safavi |
| 2015/0085745 A1* | 3/2015 | Atreya .................. H04W 16/18 |
| | | 370/328 |
| 2015/0113131 A1 | 4/2015 | Veenstra |
| 2015/0350961 A1 | 12/2015 | Cho et al. |
| 2016/0262031 A1 | 9/2016 | Huang et al. |
| 2016/0323810 A1* | 11/2016 | May ..................... H04W 76/10 |
| 2017/0325104 A1 | 11/2017 | Desai et al. |
| 2018/0115918 A1* | 4/2018 | Arjun .................... H04L 41/082 |
| 2019/0335539 A1 | 10/2019 | Polacheck et al. |
| 2019/0342795 A1 | 11/2019 | McFarland et al. |
| 2019/0380048 A1 | 12/2019 | Desai et al. |
| 2020/0028738 A1 | 1/2020 | Killadi et al. |
| 2020/0099578 A1 | 3/2020 | Venkateshwaran et al. |
| 2020/0100155 A1* | 3/2020 | Gupta .................. H04W 36/08 |
| 2020/0162322 A1 | 5/2020 | Radlein et al. |
| 2020/0241866 A1* | 7/2020 | Gupta .................... H04L 67/34 |
| 2020/0252855 A1 | 8/2020 | Polacheck |
| 2021/0036913 A1* | 2/2021 | Gupta .................. H04L 41/082 |
| 2021/0160885 A1* | 5/2021 | Gupta .................... H04L 67/34 |
| 2022/0124850 A1* | 4/2022 | Gundavelli ........... H04W 76/12 |
| 2022/0225200 A1* | 7/2022 | Smith .................. H04L 1/1893 |
| 2022/0330052 A1 | 10/2022 | Nainar et al. |

* cited by examiner

MITIGATION OF RADIO FREQUENCY (RF) OUTAGES ON A WIRELESS NETWORK

BACKGROUND

A wireless local area network (WLAN) is a wireless computer network that links two or more devices using wireless communication to form a local area network (LAN) within a physical area such as a home, school, campus, or the like. WLANs that utilize the Institute of Electrical and Electronics Engineers (IEEE) 802.11 wireless communication standards (WiFi) are among the most widely used computer networks in the world and can be deployed in a home environment, small office environment, restaurant, coffee shop, or the like to connect various client devices (e.g., laptops, smartphones, other mobile devices) to a wireless router that has a wired connection to the Internet. WLANs can also be deployed in a large enterprise environment, where numerous access points (APs) are deployed across a widespread geographic coverage area—such as a school or work campus—and provide Internet connectivity to potentially thousands of client devices. The APs in an enterprise network deployment may be spatially distributed across the desired coverage area so as to ensure that there are no coverage gaps as long as all APs are operational.

BRIEF DESCRIPTION OF THE DRAWINGS

The present disclosure, in accordance with one or more various aspects, is described in detail with reference to the following figures. The figures are provided for purposes of illustration only and merely depict typical or example aspects.

Figure 1A:
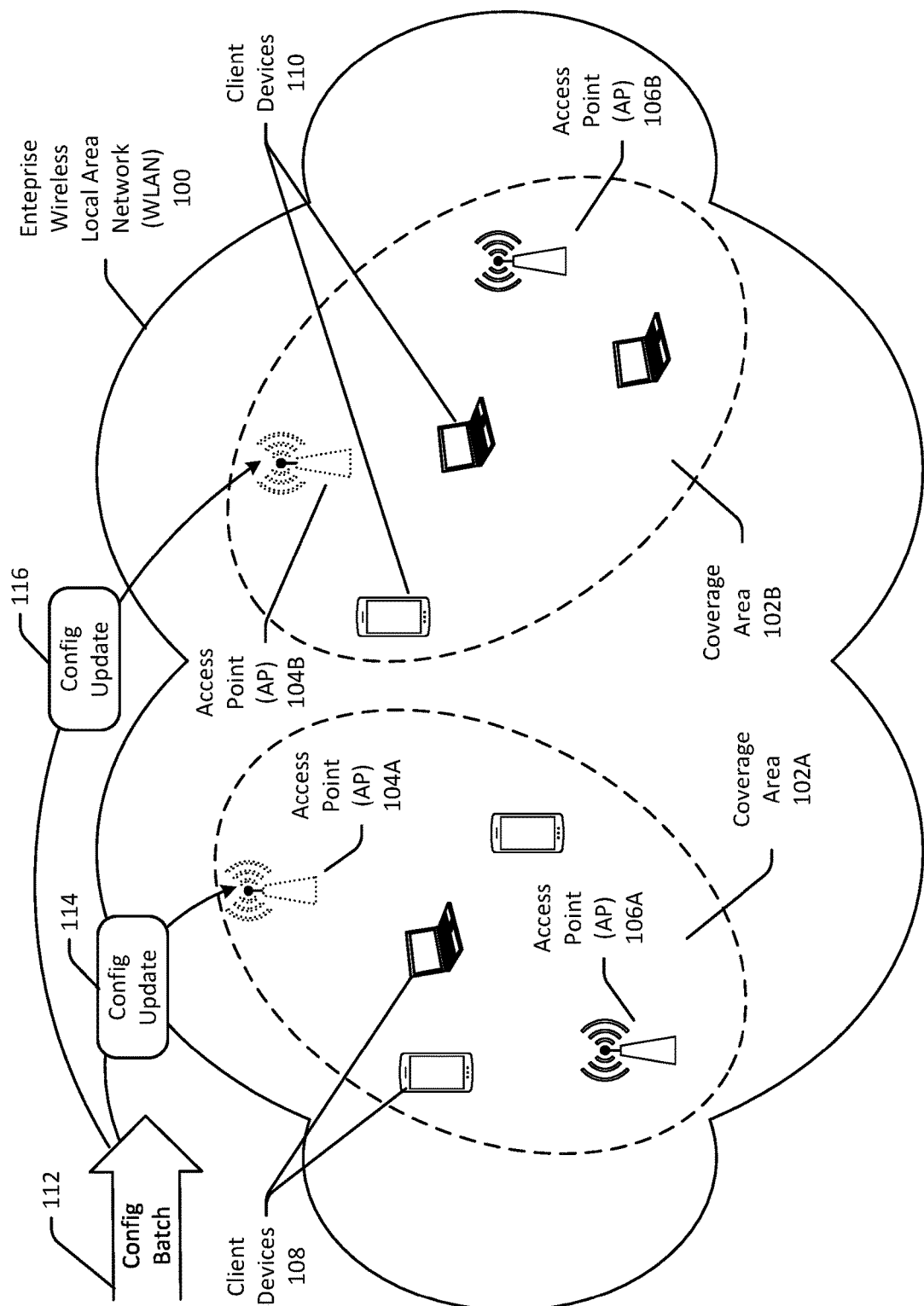
FIG. 1A schematically depicts batched deployment of a set of AP configuration updates that may include one or more high-risk configuration updates according to example aspects of the disclosed technology.

The figures are not exhaustive and do not limit the present disclosure to the precise form disclosed.

DETAILED DESCRIPTION

In an enterprise WLAN deployment, configuration deployments typically occur at a large scale, often affecting numerous AP radios simultaneously. For instance, some configuration deployments—such as channel and Effective Isotropic Radiated Power (EIRP) assignments to AP radios—can lead to large RF network outages when done on a live network due to the time needed for the network to stabilize as the AP radios move to the configuration stage. Further, during configuration deployments, client stations (also referred to herein as client STAs or simply STAs) can become disconnected, which can lead to further delay as APs become swamped with connection requests from the client stations when the APs become available for association again. There are a number of these types of scenarios involving so-called "risky" configuration deployments that can lead to significant AP downtime and corresponding coverage holes that disrupt the client experience.

In an example RF outage scenario, as a mobile user moves around different parts of an enterprise WLAN deployment, the user may experience multiple coverage holes as a result of APs becoming non-operational while being deployed with these "risky" configurations. Example types of risky configurations (also referred to herein as high-risk configurations) include: 1) a channel change to a dynamic frequency selection (DFS) channel or a weather channel that requires an AP to wait for a channel availability check (CAC) period before the AP can start beaconing, thereby causing a coverage hole, 2) a configuration update that requires a radio re-initialization, thereby triggering the CAC, and causing a coverage hole 3) a channel change for an AP without a neighbor (during a channel change, an AP is not available to serve client STAs, and in the absence of neighbors for the AP, this can lead to a coverage hole); and so forth.

The technology disclosed herein offers a technical solution to the above-described technical problem of AP coverage holes that result from high-risk configuration deployments. According to example aspects of the disclosed technology, this technical solution can take the form of systems, methods, computer-readable media, and/or techniques for: 1) identifying and flagging high-risk AP configurations (e.g., those AP configurations that have an associated risk profile that exceeds a threshold risk level, and which are, thus, more likely to lead to significant AP radio downtime), 2) determining, using an order-deploy algorithm, a candidate deployment order for deploying configurations to set of AP radios, 3) grouping the ordered AP radios into candidate deployment batches, 4) performing a batch refinement process on the candidate deployment batches to ensure that no neighbor AP radio receives a configuration deployment as part of a same deployment batch as an AP designated to receive a high-risk configuration deployment, and 5) deploying the configurations to the AP radios in accordance with the refined deployment batches. As part of the deployment batch refinement process, in the event that a neighbor AP radio is found for an AP to which a high-risk configuration is to be deployed, the neighbor AP (or the AP to be deployed with the high-risk configuration) may be removed from the candidate deployment batch and placed in a re-order list, which can then be re-ordered based on the order-deploy algorithm, potentially in parallel with generating the refined deployment batches and/or sending the configurations to the APs in accordance with the refined deployment batches. It should be appreciated that the refined deployment batches generated as a result of the batch refinement process may be referred to herein simply as deployment batches for simplicity.

In some aspects, a configurable delay may be introduced between deployment batches. That is, in some aspects, after configurations are deployed to AP radios in a given deployment batch, the deployment of configurations to AP radios in the next deployment batch in the deployment order may only occur after a delay period has elapsed. This may provide more time for the AP radios in the most recent deployment batch to recover and become operational again before configurations are deployed for the next deployment batch, thereby further mitigating the likelihood of RF outages. In some aspects, a longer delay may be introduced between deployment of a configuration for an AP radio from the re-order list than between configuration deployments corresponding to adjacent deployment batches. A configuration may be deployed to an AP radio from the re-order list either as part of a deployment batch containing multiple AP radios from the re-order list or as an individual deployment. For instance, in those example scenarios in which the last remaining APs in the re-order list cannot be batched together, their configurations may be deployed one at a time with a configurable delay there between.

It should be understood that flagging an AP configuration as a high-risk configuration may be interchangeably described herein as flagging an AP to which a high-risk configuration is to be deployed. It should be further understood that an AP configuration may be interchangeably described herein as a configuration update. That is, a configuration update, as that term is used herein, includes an update to an existing AP configuration, an entirely new configuration, or the like. It should be still further understood that the order-deploy algorithm disclosed herein may output an ordering of APs, which may then be segmented into candidate deployment batches and refined into final deployment batches. Each such deployment batch may contain a certain number of APs that are designated to receive a deployment of their respective configuration updates together with substantially no delay there between, but where APs in a given deployment batch are designated to receive their configuration updates only after a configurable delay period has elapsed since APs in a immediately prior deployment batch received deployment of their configuration updates. It should be understood, however, that while the order-deploy algorithm will generally be described herein as outputting an ordering of APs that is representative of a deployment order for configuration updates to the APs (as further determined by the deployment batches into which the ordered APs are grouped), the output of the order-deploy algorithm may also be interpreted as an ordering of AP configuration updates, where each configuration update is associated with a corresponding AP to which the configuration update is to be deployed, and the deployment batches may be correspondingly interpreted as respective groupings of the ordered AP configuration updates. It should still further be understood that the terms AP and AP radio may be used interchangeably herein. However, it should be appreciated that an AP may have multiple radios such as a first radio that operates in a first RF band (e.g., 2.4 GHz) and a second radio that operates in a second RF band (e.g., 5 GHz), in which case, the ordering of APs may, in fact, be an ordering of AP radios, where each of a given AP's radios may appear in the ordering. It should be understood that while the 2.4 and 5 GHz bands may be referenced herein as illustrative RF bands, aspects of the disclosed technology are applicable to any suitable RF band, including the 6 GHz band, which was recently opened up to unlicensed use and is made available for wireless communication under the WiFi 6E standard, as well as any other RF band that may be used in the future.

In example aspects of the disclosed technology, the order-deploy algorithm operates to spread out deployment of AP configurations both spatially (in terms of locations of APs to which configurations are simultaneously deployed) as well as temporally (in terms of the delays introduced between configuration deployments) in order to mitigate the impact of client connectivity issues and extended client roaming that may result from simultaneous AP configuration deployments. In some aspects, the order-deploy algorithm determines a deployment order for sending configurations to APs based on a designated hierarchy of various AP radio network factors/characteristics. In certain aspects, the factors, in decreasing order of priority, may be: band, switch, RF-domain, RF-partition, and channel. It should be appreciated, however, that this is merely an illustrative and non-exhaustive list of network factors that can be considered. It should further be appreciated that the factors can be prioritized differently than the order noted above.

In some aspects, the order-deploy algorithm determines the order in which AP configurations are to be deployed by spacing apart configuration deployments for APs that share the same switch, RF-domain, or RF-partition (i.e., not placing them in the same deployment batch) and by batching together configuration deployments to AP radios that share the same RF band and/or RF channel. For example, if both the 2.4 and 5 GHz operating bands of an AP radio go down at the same time due to simultaneous configuration updates, a coverage hole can occur. Therefore, it is desirable to introduce a delay between configuration updates for different bands, which is achieved in example aspects of the disclosed technology by batching configuration updates for the same band together. Thus, if a group of AP radios operating within a same band in a same switch, RF domain, and/or RF partition experience simultaneous outages due to at least partially concurrent configuration deployments, other radios in the same switch, RF domain, and/or RF partition that operate in a different band remain operational, thereby avoiding a coverage hole. Further, example aspects of the disclosed technology leverage available channel assignment algorithms which seek to assign different channels to spatially proximal APs in order to minimize interference. In this manner, batching together configuration deployments to AP radios on the same channel helps to avoid coverage holes because AP radios on the same channel are likely to spatially distant from one another.

More generally, in some aspects, the order-deploy algorithm may receive, as inputs, i) a set of APs to which respective configuration updates are to be deployed, ii) a set of network factors, iii) a network factor hierarchy that identifies a relative prioritization of the network factors, iv) respective sets of values of the network factors for the set of APs, and v) configuration deployment ordering criteria. In some aspects, the order-deploy algorithm may iterate through the set of APs based on the network factor hierarchy and evaluate the respective sets of values of the network factors for the set of APs against the configuration deployment ordering criteria to determine a deployment order. In some aspects, the deployment order may be an ordering of the set of APs that represents a candidate order in which the set of configuration updates are to be deployed to the set of APs. For example, a stored mapping of APs to their corresponding configuration updates may be maintained and accessed to determine the order in which the configuration updates are to be deployed based on the ordering of the set of APs. In other example aspects, the output of the order-deploy algorithm may be an ordering of the set of AP configuration updates themselves.

In some aspects, the configuration deployment ordering criteria may specify that respective values of a first network factor (e.g., band, channel) match for consecutive APs in the ordering of the set of APs and that respective values of a second network factor (e.g., switch IP, RF domain, RF partition) differ for consecutive APs in the ordering of the set of APs. In some cases, the first network factor (e.g., band) may be a higher priority network factor in the network factor hierarchy than the second network factor (e.g., switch IP). The example configuration deployment ordering criteria noted above may be consistent with the objective of the order-deploy algorithm to spread out AP configuration deployments both spatially and temporally. In particular, APs that share the same switch IP, RF domain, and/or RF partition are generally located spatially proximal to one another. Thus, by ordering the APs such that consecutive APs in the ordering do not share the same switch IP, RF domain, and/or RF partition, it is likely that more time elapses between when APs that are located close to one another receive their respective configuration deployments. Further, by consecutively ordering, in the configuration deployment order, AP radios operating on a first band, AP radios operating on a different band remain operational while configuration updates are being deployed to the AP radios on the first band.

In some aspects, while the configuration deployment ordering criteria generally seeks to have consecutive APs in the deployment order have different values with respect to certain network factors (e.g., switch IP, RF domain, RF partition), the criteria may also allow for consecutive APs in the ordering to have the same values for one or more such network factors as long as the values for other network factor(s) (e.g., a network factor having a higher priority in the network factor hierarchy) differ. For example, in some aspects, the RF partition value for consecutive APs in the deployment order may be the same as long as the RF domain and/or switch IP values differ for the consecutive APs. This may be the case because even though the RF partition values are the same, they actually represent different partitions in different RF domains and/or different switches.

Further, in some aspects, the configuration deployment ordering criteria may require that values for certain network factor(s) differ for non-consecutive APs as well, if the APs form part of the same candidate deployment batch. In particular, as noted earlier, once the order-deploy algorithm determines an ordering of AP radios that reflects a candidate deployment order for configuration updates for the AP radios, the ordered AP radios may be grouped into candidate deployment batches of a predetermined batch size, which are then refined through a deployment batch refinement process into final deployment batches. Assume, for example, that a batch size of 4 is used, that the order-deploy algorithm places AP1, AP2, AP3, and AP4 in that order in a deployment ordering of the APs, and that AP1-AP4 form part of a candidate deployment batch. Each of AP1-AP4 may be radios that operate in the same band (e.g., 2.4 GHz). As noted earlier, RF band may be a highest priority network factor in a network factor hierarchy, and the configuration deployment ordering criteria may seek to order AP radios that operate in a first band consecutively so that they are grouped into a sample deployment batch and receive their respective configuration updates at least partially concurrently, and so that configuration updates to AP radios operating in a different band occur at a different time when the AP radios in the first band are expected to be operational again, thereby mitigating the likelihood of a coverage hole.

In some aspects, switch IP may be the next highest priority network factor after RF band in the network factor hierarchy. In this example, assume that there are two possible switch IP values (i.e., there are 2 switches in the network deployment). As such, AP1 may be in switch 1, AP2 in switch 2, AP3 in switch 1, and AP4 in switch 2. The order-deploy algorithm may toggle between the switch values when ordering AP1-AP4 in order to satisfy configuration deployment ordering criteria requiring that switch values for consecutive APs in the deployment ordering differ from each other. Assume further that in this example there are two RF domains (RF domain 1 and RF domain 2) in switch 1 and one RF domain (RF domain 3) in switch 2, and that RF domain 3 includes two RF partitions—RF partition 1 and RF partition 2. As a result of switch 2 including the single RF domain (RF domain 3), both AP2 and AP4 may have switch 2 and RF domain 3 as their values for the switch and RF domain network factors, respectively.

In this example, the configuration deployment ordering criteria may call for AP4 to be assigned after AP1-AP3 in the ordering because, while AP4 is in a same RF domain (i.e., RF domain 3) as another AP in the same candidate deployment batch (i.e., AP2), it is in a different RF partition (i.e., RF partition 2) than AP2 (which is in RF partition 1 of RF domain 3). Even though AP2 and AP4 are not consecutively ordered, they do form part of the same candidate deployment batch, and as such, may receive their respective configuration deployments concurrently. Therefore, even though AP2 and AP4 are non-consecutively ordered, the configuration deployment ordering criteria may select AP4 because it is in a different RF partition from AP2, thereby ensuring that AP radios in the same RF partition of the same RF domain do not receive their respective configuration deployments as part of the same deployment batch.

In an example implementation, the order-deploy algorithm may identify a set of APs to which configuration updates are to be deployed. The order-deploy algorithm may then select an initial AP radio from the set of APs. In some aspects, the initial AP radio may be arbitrarily selected. In other aspects, the initial AP radio may be selected based on its values for the set of network factors. For instance, the initial AP radio that is selected may be one that is associated with a particular switch IP, one that is within a particular RF domain or RF partition, or the like. Upon identifying the set of values of the set of network factors for the initially selected AP and assigning the initially selected AP to a first position in an ordering of the set of APs, the order-deploy algorithm may then proceed to iteratively assign each remaining unselected AP to a respective corresponding position in the ordering. An AP that has not yet been ordered may be referred to as an unselected AP or an unassigned AP.

In particular, the order-deploy algorithm may perform an iterative assignment process that iterates through the unassigned APs and through one or more network factors based on the network factor hierarchy in order to identify, at each iteration, an unassigned AP having values for the set of network factors that satisfy configuration deployment ordering criteria with respect to the network factor values of a most recently assigned AP in the ordering, and potentially, with respect to one or more prior assigned APs. In a first iteration of the algorithm, after the initially selected AP is assigned to the first position in the ordering, the order-deploy algorithm may select the next AP radio by iterating through unassigned AP radios to identify those AP(s) that have a value for the highest priority network factor that satisfies configuration deployment ordering criteria with respect to a value of the highest priority network factor for the initially selected AP radio. For example, if the highest priority factor of the initially selected AP radio is RF band, the order-deploy algorithm may identify each unassigned AP radio that operates in the same band based on deployment criteria that seeks to group APs in the same band together so that their configuration updates are deployed together.

In the case of multiple such AP radios being identified, the order-deploy algorithm may iterate to the next highest priority network factor in the network factor hierarchy (e.g., switch IP). More specifically, the order-deploy algorithm may iterate through the subset of APs identified as operating in the same RF band as the initially selected AP to identify those AP(s) in the subset that have a different switch IP value (i.e., are associated with a different switch) than the initially selected AP. The order-deploy algorithm may continue in this manner—iterating to the next network factor in the hierarchy and comparing a value of that next network factor for the initially selected AP to values of the next network factor for each unassigned AP identified from the evaluation of the previous network factor in the hierarchy to determine which AP(s) meet the configuration deployment ordering criteria. The order-deploy algorithm may continue in this fashion until a single AP is identified for assignment to the next available position in the ordering of APs or until the set of network factors has been exhausted, in which case, a first AP identified as satisfying the deployment ordering criteria for the lowest priority network factor in the hierarchy may be selected for the next position in the ordering of the set of APs. The order-deploy algorithm may continue in this manner until all unassigned APs have been ordered, where at each iteration of the algorithm, the network factor values of the most recently assigned AP may be used, in conjunction with deployment ordering criteria, to determine the next AP to place in the ordering.

FIG. 1A schematically depicts batched deployment of a set of AP configuration updates that may include one or more high-risk configuration updates. A portion of an example enterprise WLAN deployment 100 is shown in FIG. 1A. The depicted portion of the deployment 100 includes a first coverage area 102A and a second coverage area 102B. In some aspects, the first coverage area 102A may be an RF area that is served by a particular mobility device. The same may be true for the second coverage area 102B. In other aspects, the first coverage area 102A and/or the second coverage area 102B may be an RF domain or an RF partition within an RF domain. For instance, coverage areas 102A and 102B may be RF partitions within a same RF domain.

The first coverage area 102A may include AP 104A and AP 106A serving client devices 108. The second coverage area 102B may include AP 104B and AP 106B serving client devices 110. It should be appreciated that FIG. 1 depicts a sampling of APs in the deployment 100 and a sampling of client devices served by those APs. In reality, the deployment 100 may include hundreds or perhaps even thousands of APs serving thousands of client devices. It should further be appreciated that the enterprise WLAN deployment may include any number of switches, RF domains, and/or RF partitions.

As shown in FIG. 1A, a batched set of configuration updates 112 is being deployed to certain APs in the enterprise network 100. In particular, APs 104A, 104B may have been identified, among the various APs of the network 100, as designated for receiving a deployment of respective configuration updates. A configuration update may include a set of configuration parameters that are pushed to an AP. The configuration parameters may include channel parameters, operational mode parameters, power parameters, or the like. A variety of types of AP events may trigger the deployment of a configuration update. For instance, AP 104A and/or AP 104B may have switched to a different channel and may now require a configuration update to operate on the new channel. As another non-limiting example, an AP radio may require a regulatory update when the number of allowed channels or the maximum power permitted on the channels changes for an AP, or in a region, country, or the like in which the AP is operating. It should be appreciated that there are numerous other events that can trigger deployment of a configuration update.

In various scenarios, deploying a configuration update to an AP may result in a coverage hole. For instance, when an AP switches to a DFS channel or a weather channel, the AP waits for a period of time—known as a channel availability check (CAC) period—before the AP can start sending out beacons on the new channel. In a number of deployments, as the other channels become crowded, APs may switch to a DFS channel or a weather channel to improve performance. During the CAC period, the AP may be non-operational, which may cause a coverage hole if there are no other available APs to serve the client devices that were being served by the AP prior to the channel switch. The CAC period can range anywhere from one minute to as many as ten minutes in the case of a channel change in the European Union (EU) to a channel that is within or that overlaps with the frequency range 5600-5650 MHz. As previously noted, during the CAC period, an AP is not able to send out beacons. In some cases, even one minute of beacon loss, or perhaps even less, is sufficient to cause client devices to roam. Moreover, once the AP is operational again and beaconing, the AP may be flooded with association requests from the client devices, which can overload the AP and further extend and exacerbate the service gap until all clients are re-associated with the AP.

In addition to channel changes that require a CAC period, coverage holes may also occur when an AP with no neighbor APs switches to another channel, regardless of the type of channel. For instance, while an AP is switching to another channel, and potentially until it receives a new configuration deployment for the new channel, the AP may be unavailable to serve the client STAs that were associated with it on the previous channel. In the absence of any neighbor AP to take over, a coverage hole may occur and remain until the AP completes the channel change. A neighbor AP for a given AP may be an AP having less than a threshold amount of pathloss with respect to the given AP.

Another type of configuration deployment that can result in a coverage hole is a configuration that results in reinitialization of an AP's radio. For example, while an AP is operating within a DFS channel or a weather channel, a configuration update that requires an AP radio reinitialization may cause the AP radio to power down and up again. This can trigger the CAC period and result in a service disruption to clients associated with the AP even though no channel change has occurred. For instance, a regulatory update to a live AP operating on a DFS channel may cause a radio reinitialization. Regulatory updates may be performed when the number of allowed channels and/or the maximum power permitted on the channels changes for an AP/country/region.

In example aspects of the disclosed technology, configuration updates such as those described above that result in an AP becoming non-operational for a period of time and leading to a potential coverage hole are classified/labeled as high-risk configuration updates. For instance, a flag may be set in a data structure storing data associated with the configuration update to indicate that the configuration is a high-risk configuration. In some aspects, a risk profile may be maintained for each configuration. The risk profile may include data/metadata associated with the configuration, where such data/metadata may be indicative of characteristics of the configuration and/or of the AP to be updated that affect whether and for how long the AP is expected to be non-operational after deployment of the configuration update. Such data/metadata may include, without limitation, a duration of a CAC period, a number of neighbor APs for the AP, a number of client devices associated with the AP, and so forth. In some aspects, such data/metadata may further include network factor values for the AP to which the configuration will be deployed such as values for the RF band of the AP radio; the switch IP corresponding to the AP; the RF domain and/or the RF partition in which the AP is located, and/or the channel the AP is operating on.

In some aspects, a metric (e.g., a risk score) that quantifies a likelihood that a coverage hole results from deployment of a configuration update may be determined. A risk score may be a weighted measure of one or more characteristics of the configuration update and/or of the AP, as represented by the data/metadata stored in the risk profile. In some aspects, the risk profile for a configuration update may be compared to a threshold risk level to determine whether to flag the configuration update (or the AP to which the update is to be deployed) as high-risk. More specifically, in example aspects, if a risk score for a configuration update exceeds a threshold risk score, the configuration update (or the AP to be deployed with the update) may be flagged as high-risk.

In some aspects, the risk score may be based on the duration of the CAC period caused by the configuration update (or some multiplier/percentage of the CAC period), in which case, the risk score may be compared to a threshold duration of time, and if determined to exceed the threshold time, the configuration update may be deemed a high-risk configuration. In other aspects, the risk score may be calculated based on several factors/characteristics. For example, the risk score may be a weighted combination (e.g., a linear combination) of quantified measures of different characteristics/factors. As a specific, non-limiting example, the risk score may be a weighted combination of the CAC duration, the number of neighbor AP(s) for the AP to be configured, and/or the number of client devices being served by that AP. In some aspects, the risk score for a configuration update may be based on one or more network factor values for the AP designated to receive the update. For instance, the risk score may be greater for a particular RF band, switch, RF domain, RF partition, and/or channel than for another. As a specific, non-limiting example, a risk score associated with a configuration update for an AP in a given RF domain/RF partition may be greater for those RF domains that have more APs and/or more RF partitions within them, and/or those RF partitions that have more APs.

Referring again to FIG. 1A, the set of configuration updates 112 may include respective updates deployed to APs within a same deployment batch. More specifically, AP 104A and AP 104B may form part of the same deployment batch and may be designated to receive respective configuration updates 114 and 116. As disclosed herein, in some aspects, an order-deploy algorithm may have been executed to order AP 104A and AP 104B within an ordering of a set of APs designated to receive configuration updates. Based on the this ordering, AP 104A and AP 104B may have been grouped into the same candidate deployment batch, and after batch refinement, may have remained in the same deployment batch. In particular, in those example aspects in which the configuration update 114 for AP 104A and/or the configuration update 116 for AP 104B is a high-risk configuration, AP 104A and AP 104B may have remained in the same deployment batch after batch refinement processing because neither AP is a neighbor AP to the other.

In a similar fashion, the order-deploy algorithm may have also ordered APs 106A, 106B within the ordered set of APs that includes AP 104A and AP 104B. As previously noted, the objective of the order-deploy algorithm is to spread out the deployment of configurations both spatially and temporally such that the delay between configuration deployments to APs and the proximity of the APs to one another are inversely related. Thus, because AP 106A is in the same coverage area 102A (e.g., RF domain, RF partition, etc.) as AP 104A, the order-deploy algorithm may place AP 106A a sufficient number of positions away from AP 104A in the ordered set of APs to ensure that AP 104A and AP 106A are not grouped into the same deployment batch. Similarly, given that AP 104B and AP 106B are in the same coverage area 102B, the order-deploy algorithm may place AP 106B a sufficient number of positions away from AP 104B to ensure that AP 104B and AP 106B are not grouped into the same deployment batch.

In some aspects, AP 106A and AP 106B may be grouped into a same deployment batch, which as noted above, would be a different deployment batch from the one that includes AP 104A and AP 104B. More specifically, per the order-deploy algorithm, AP 104A and AP 104B may be grouped into a first candidate deployment batch and AP 106A and AP 106B may be grouped into a second candidate deployment batch different from the first candidate deployment batch. Further, as with AP 104A and AP 104B, even if one or more both of AP 106A and AP 106B are designated to receive high-risk configurations, they may remain in the same deployment batch together after batch refinement processing because neither AP is a neighbor AP to the other. Avoiding placing an AP being deployed with a high-risk configuration and a neighbor AP to that AP in the same deployment batch ensures the availability of the neighbor AP to client devices while the AP receiving the high-risk configuration is non-operational.

Per the batch deployment process disclosed herein, AP 106A and AP 106B would receive their respective configuration updates at a different time from AP 104A and AP 104B. In some aspects, if AP 104A/AP 104B and AP 106A/AP 106B are in consecutive deployment batches, AP 106A and AP 106B may receive their respective configurations after a delay period has elapsed since configurations 114, 116 were deployed to AP 104A and AP 104B, respectively. In other aspects, if AP 104A/AP 104B and AP 106A/AP 106B are not in consecutive deployment batches (i.e., there are one or more other deployment batches in between), AP 106A and AP 106B may receive their respective configurations after an even longer period of time has elapsed since configurations 114, 116 were deployed to AP 104A and AP 104B, respectively.

Figure 1B:
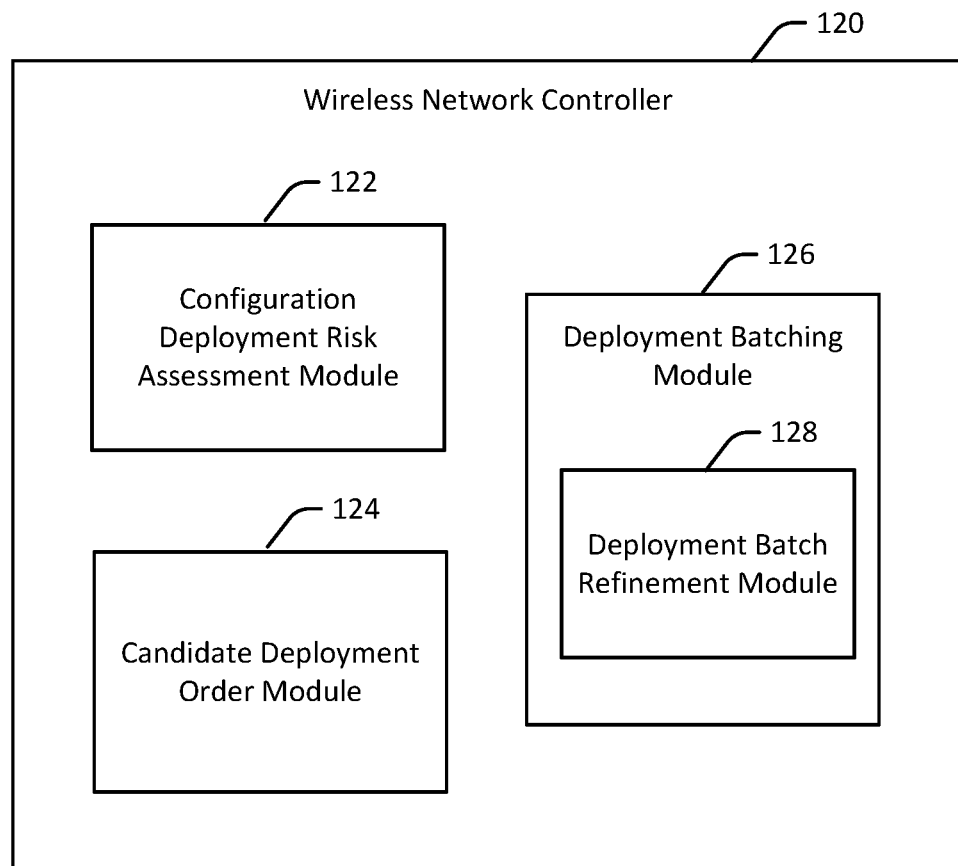
FIG. 1B is a schematic block diagram of illustrative hardware and/or software components configured to implement features of example aspects of the disclosed technology.

Referring now to FIG. 1B, example components configured to implement aspects of the disclosed technology are depicted. A wireless network controller 120 is provided that may include various modules, each of which may be configured to provide respective functionality in connection with the ordering and deployment of configuration updates to APs within, for example, an enterprise WLAN deployment. The modules may include a configuration deployment risk assessment module 122, a candidate deployment order module 124, a deployment batching module 126, and a deployment batch refinement module 128 (module 128 may be a sub-module of the deployment batching module 126). It should be appreciated that the modules depicted in FIG. 1B are illustrative and not exhaustive. It should further be appreciated that functionality described as being provided by a given module may be performed, at least in part, by one or more other modules, and more generally, the overall functionality disclosed herein may be modularized differently in other aspects (e.g., greater or fewer number of modules).

In some aspects, the configuration deployment risk assessment module 122 may be configured to identify those configuration updates that are high-risk based on their corresponding configuration parameters. As previously described, the configuration deployment risk assessment module 122 may calculate risk score from a risk profile of a configuration update and compare the risk score to a threshold level of risk to determine whether to classify the configuration update as high-risk and flag the configuration or the AP to which it is designated for deployment accordingly. More specifically, the module 122 may flag as high-risk those configurations having an associated risk profile or metric derived therefrom (e.g., risk score) that exceeds a threshold level of risk (e.g., a threshold risk score).

In some aspects, the candidate deployment order module 124 may be configured to execute an order-deploy algorithm to order a set of APs designated to receive configuration updates. The ordered set of APs thus obtained may represent a candidate deployment order for deploying configuration updates to the APs. The order-deploy algorithm may seek to place APs that are spatially proximal to one another farther away from one another in the ordering of the set of APs so that APs that are close to each other receive their configuration deployments at different times, and thus, are less likely to be concurrently non-operational. The order-deploy algorithm may achieve this by ensuring that APs having the same values for network factors indicative of an AP's location within the network deployment (e.g., switch IP, RF domain, RF partition) are not placed adjacent to one another in the ordering, and in some aspects, are not placed within X positions of one another in the ordering, where X represents a deployment batch size.

On the other hand, for certain network factors such as RF band and channel, the order-deploy algorithm may seek to place APs that share the same band and/or channel close to one another in the ordering. By ordering AP radios operating in the same RF band together in the candidate deployment order, AP radios within a same band are likely to receive their configuration updates together and at a different time than AP radios operating in a different band. In this manner, even if an AP radio operating in a first band (e.g., 2.4 GHz) becomes non-operational due to a configuration update deployment, a spatially proximal AP operating in a second band (e.g., 5 GHz) may remain available for association, thereby avoiding a coverage hole. Further, with respect to the channel network factor, by assigning APs operating on the same channel close to one another in the candidate deployment order, the order-deploy algorithm may leverage channel assignment algorithms that assign the same channel to APs that are distantly located from one another.

In some aspects, the deployment batching module 126 may be configured to take an ordered set of APs as input from the candidate deployment order module 124 and group the ordered APs into candidate deployment batches of a predetermined configurable batch size. The deployment batch refinement module 128 may be configured to then perform batch refinement processing on the candidate deployment batches. As part of the batch refinement processing, the deployment batch refinement module 128 may be configured to iterate through the candidate deployment batches, and identify each batch (if any) that includes a flagged AP (i.e., an AP to which a high risk configuration update is to be deployed), or alternatively, that includes an AP designated for receiving (i.e., having a stored association with) a configuration update flagged as high-risk.

For any such candidate deployment batch that includes an AP to which a high-risk configuration is to be deployed, the deployment batch refinement module 128 may be configured to remove from the candidate deployment batch i) the flagged AP/the AP to be deployed with the flagged configuration update or ii) the neighbor AP to the flagged AP/the AP to be deployed with the flagged configuration. In some aspects, the candidate deployment batch thus modified may become a refined deployment batch containing a number of APs less than the predetermined batch size. In other aspects, the deployment batch refinement module 128 may be configured to add an AP from an adjacent candidate deployment batch into the modified candidate deployment batch to maintained the predetermined batch size (as long as the adjacent candidate deployment batch includes an AP that is not a neighbor AP to any AP in the modified candidate deployment batch).

The deployment batch refinement module 128 may be configured to place the removed AP in a re-order set. Thereafter, the candidate deployment order module 124 may be configured to execute the order-deploy algorithm on the re-order set to obtain a set of ordered APs containing only APs from the re-order set. This set of ordered APs may again be subjected to candidate deployment batching and then batch refinement processing. This process may continue until all APs have been placed in a refined deployment batch, until no two APs in the re-order set are eligible, in view of the batching criteria, to be grouped together in a same deployment batch, or until only a single AP remains in the re-order set. If no further batching is possible for the AP(s) in the re-order set, then the AP(s) in the re-order set may be individually deployed with a time delay period introduced between any such individual deployments.

The wireless network controller 120 may reside on a central server within the network deployment or within a cloud environment remote from the network deployment. In some aspects, the wireless network controller 120 may reside on a switch (e.g., a mobility device) or the functionality of the wireless network controller 120 may be distributed across multiple mobility devices. In some aspects, at least a portion of the functionality provided by modules of the wireless network controller 120 may be distributed across one or more of the APs in the network deployment. In some aspects, the wireless network controller 120 may include one or more processors, which may include any of the types of processors described later in this disclosure in reference to processor(s) 904 of the computing component 900 depicted in FIG. 9. In some aspects, the wireless network controller 120 may be reside on or be embodied as the computing component 900.

Figure 2:
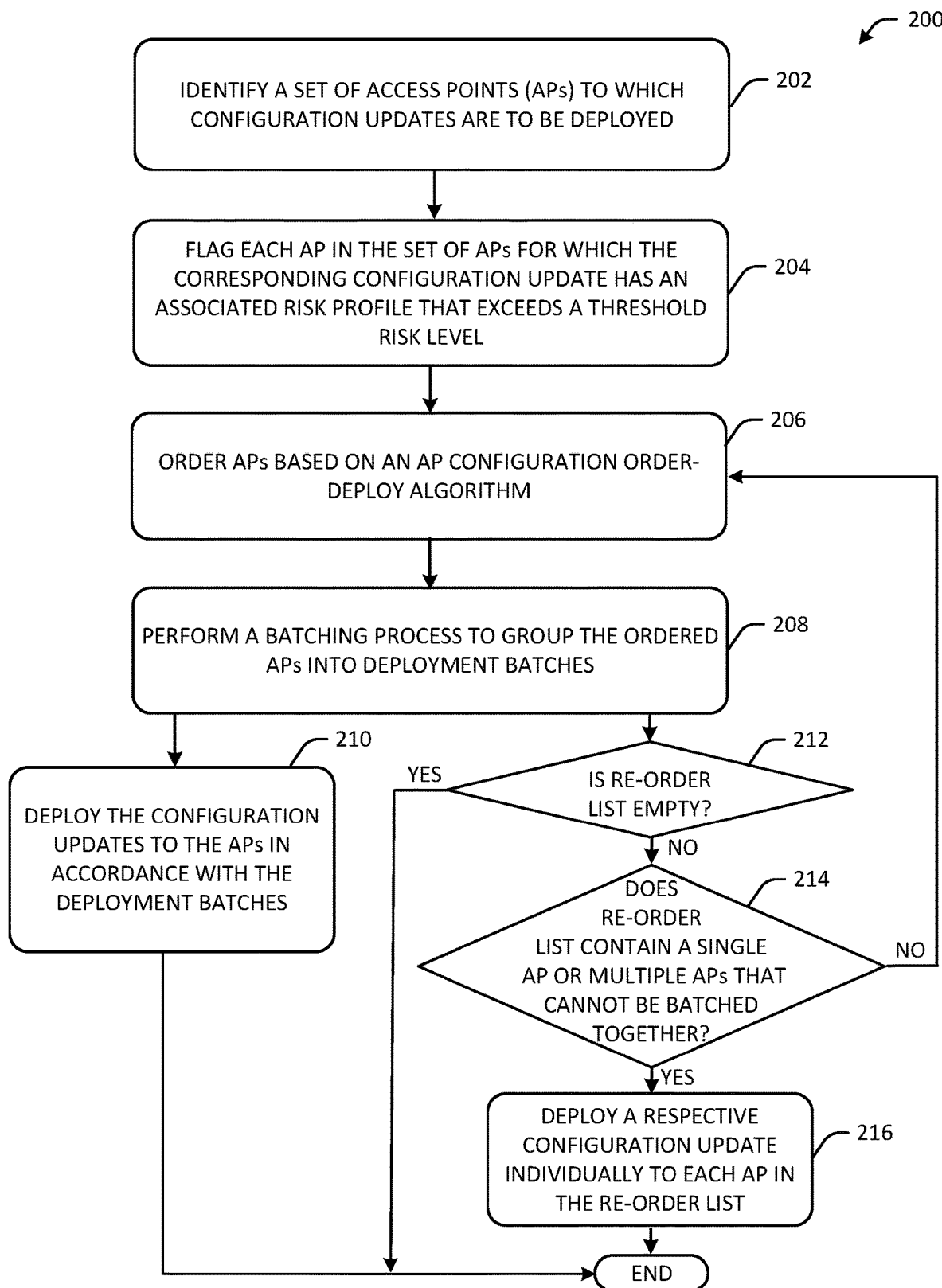
FIG. 2 is a flowchart of an illustrative method for batching the deployment of a set of AP configuration updates that may include one or more high-risk configuration updates according to example aspects of the disclosed technology.

An overall process for ordering a set of APs based on configuration deployment ordering criteria, grouping the ordered APs into candidate deployment batches, refining the candidate deployment batches to ensure that neighbor APs are not in the same batch together if either of the neighbor APs is being deployed with a high-risk configuration, and deploying the configurations in accordance with the refined deployment batches with predetermined delay periods between adjacent deployment batches will now be described with reference to the illustrative method 200 of FIG. 2. A batch refinement process according to example aspects of the disclosed technology will then be described in detail with reference to the illustrative method of FIG. 3. This will be followed by a description of a process for ordering a set of APs to obtain a candidate deployment order for deploying configuration updates to the APs, which will be described in detail with reference to the illustrative method of FIG. 4. A more detailed implementation for determining a candidate deployment order for a set of APs using an order-deploy algorithm will then be described with reference to the illustrative method of FIG. 5.

Referring first to FIG. 2, at block 202 of the method 200, a set of APs to which configuration updates are to be deployed may be identified. As previously noted, the set of APs may include an AP that has switched channels, an AP that needs a radio reinitialization, or the like. At block 204 of the method 200, each AP in the set of APs that is designated to receive a high-risk configuration update may be flagged. Alternatively, each high-risk configuration itself may be flagged. In some aspects, various configuration parameters (e.g., channel, operational mode, power, etc.) may be computed for each configuration update and provided to the configuration deployment risk assessment module 122. The module 122 may further access/receive a respective risk profile for each configuration update. The module 122 may be configured to evaluate the information in a risk profile against various risk criteria to determine whether a configuration update is a high-risk configuration—one that poses more than a threshold level of risk. In some aspects, the module 122 may determine a period of time that the AP is expected to be non-operational during deployment of the configuration update (e.g., a CAC check time period) and may compare this to a threshold period of time. If the CAC period, for example, exceeds the threshold time, the module 122 may flag the configuration update as high-risk. In other aspects, the module 122 may generate a risk score for a configuration update based on information contained in the corresponding risk profile, and may compare the risk score against a threshold risk score to determine whether the configuration is high-risk.

At block 206 of the method 200, the candidate deployment order module 124 may order the set of APs in accordance with configuration deployment ordering criteria. More specifically, in some aspects, the candidate deployment order module 124 may order the set of APs by executing an order-deploy algorithm that seeks to increase the time delay between deployment of configuration updates to spatially proximal APs, and thereby mitigate the likelihood of coverage holes occurring as a result of APs becoming non-operational during configuration deployments. As noted, an example implementation of the order-deploy algorithm will be described in more detail later in this disclosure with reference to FIG. 5.

At block 208 of the method 200, the deployment batching module 126 may perform a batching process to first group the set of ordered APs into candidate deployment batches, and then ultimately, into refined deployment batches. This batching process will be described in more detail later in this disclosure with reference to FIG. 3. As part of this batching process, the deployment batch refinement module 128 may be configured to perform a batch refinement process, whereby each candidate deployment batch is iterated through to ensure that no neighbor AP is grouped into a same deployment batch as an AP designated to receive a high-risk configuration. For each candidate deployment batch where this is the case, the module 128 may be configured to remove the AP to be deployed with the flagged high-risk configuration update or the neighbor AP and add the removed AP to a re-order set (alternatively referred to herein as a re-order list). Use of the terms "set," "list," or the like herein shall not be construed as being limited to any particular type of data structure. Further, a set, list, or the like shall not be construed as necessarily having an order associated therewith unless it is specifically referred to as being ordered (as in the case of the ordered set of APs that is ordered based on configuration deployment ordering criteria).

Blocks 212-216 of the method 200 represent processing performed with respect to the re-order set. In some aspects, the deployment batching module 126 may be configured to perform the operations at blocks 212-216. In some aspects, configuration updates can be deployed, at block 210, to APs in refined deployment batches at least partially concurrently with the processing of blocks 212-216. As previously noted, configuration updates may be deployed to APs in a same deployment batch substantially simultaneously, and a delay period may be introduced between deployments corresponding to different (e.g., consecutive) deployment batches.

At block 212 of the method 200, the deployment batching module 126 may determine whether the re-order set is empty. The re-order set may be empty after a first iteration of the batch refinement process if, for example, no neighbor APs were grouped into a same candidate deployment batch as an AP to be deployed with a high-risk configuration. The re-order set may be empty after a subsequent iteration of the batch refinement process if, for example, all APs added to the re-order set were able to be grouped into one or more refined deployment batches and subsequently receive their configuration deployments.

In response to a positive determination at block 212, the method 200 may end. On the other hand, in response to a negative determination at block 212, a further determination may be made at block 214 as to whether the re-order set contains only a single AP or multiple APs that cannot be placed together in one or more deployment batches due to batching criteria. For instance, a positive determination may be made at block 214 if the re-order set contains multiple APs, but no two or more of the APs can be placed in the same deployment batch without violating batching criteria that requires that a neighbor AP not be placed in a same deployment batch as an AP designated to receive deployment of a high-risk configuration update. In response to a positive determination at block 214, the method 200 may proceed to block 216, where a respective configuration update may be individually deployed to each AP in the re-order set, with a configurable delay period introduced between deployments in the case of multiple individual deployments. On the other hand, in response to a negative determination at block 214, the method 200 may proceed again to 206, where the candidate deployment order module 124 may execute the order-deploy algorithm on the APs contained in the re-order set. The method 200 may then proceed iteratively in this fashion until all configuration updates have been deployed to respective APs.

Figure 3:
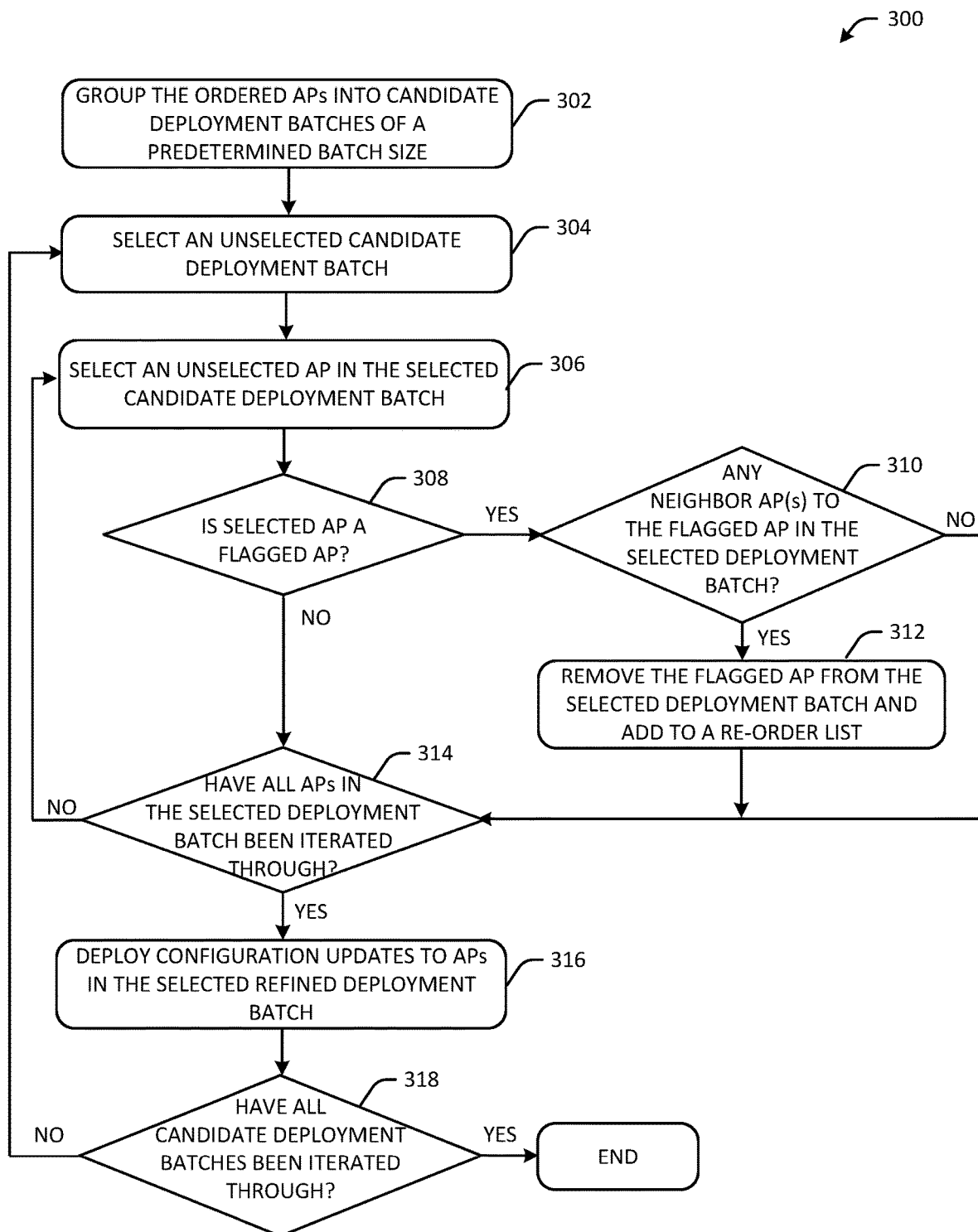
FIG. 3 is a flowchart of a more detailed implementation for batching the deployment of a set of AP configuration updates that may include one or more high-risk configuration updates according to example aspects of the disclosed technology.

FIG. 3 is a flowchart illustrating a more detailed implementation of the batching and batch refinement processes. The illustrative method 300 assumes that the order-deploy algorithm has been executed on a set of APs to obtain an ordered set of APs. While the method 300 is described in relation to batch processing performed on an initial set of ordered APs, it should be appreciated that the method 300 may be performed on an ordered set of APs from the re-order set as well. In example aspects, the deployment batching module 126, or more specifically, the deployment batch refinement module 128 may perform one or more operations of the method 300.

At block 302 of the method 300, the set of ordered APs may be grouped into candidate deployment batches. Depending on the number of APs in the ordered set of APs, the last candidate deployment batch group may include less than the batch size number of APs. Each candidate deployment batch may have a predetermined batch size, which may depend on the size of the network deployment. For instance, the batch size may increase as the number of APs in the network deployment and/or the number of APs needing configuration updates increases. In some aspects, the batch size may be configurable based on changing network conditions. For instance, the batch size may be modified as APs are added to or removed from the deployment, as network latency changes, as the number of APs needing configuration updates at a given time changes, or the like.

At block 304 of the method 300, a previously unselected candidate deployment batch may be selected for batch refinement processing. At block 306 of the method 300, an unselected AP within the currently selected candidate deployment batch may be selected. At block 308 of the method 300, a determination may be made as to whether the selected AP is a flagged AP, or equivalently, whether the selected AP is to receive a deployment of a configuration update that has been flagged as being high-risk.

In response to a positive determination at block 308, the method 300 may proceed to block 310, where a determination is made as to whether there are any neighbor AP(s) to the flagged AP in the same selected candidate deployment batch. As previously described, an AP may be determined to be a neighbor AP to another AP if the pathloss between the APs is within a threshold value. In response to a positive determination at block 310, the method 300 may proceed to block 312, where the flagged AP or the neighbor AP(s) may be removed from the candidate deployment batch and placed in a re-order list. In some aspects, after the flagged AP or neighbor AP(s) is removed, the candidate deployment batch may remain at a size that is less than the predetermined batch size. In other aspects, one or more APs from a subsequent candidate deployment batch may be added to the currently selected candidate deployment batch to bring the size back up to the predetermined batch size.

From block 312, the method 300 may proceed to block 314, where a determination is made as to whether all APs in the selected candidate deployment branch have been iterated through for evaluation of whether a neighbor AP is in the same deployment batch. The method 300 may also proceed to block 314 directly from block 308 in the event that the currently selected AP is not a flagged AP (i.e., a negative determination at block 308). In addition, the method 300 may proceed to block 314 in response to a negative determination at block 310 that no neighbor AP to the currently selected AP is in the same candidate deployment batch.

At block 314 of the method 300, a determination is made as to whether all APs in the selected candidate deployment batch have been iterated through. In response to a negative determination at block 314, the method 300 may proceed iteratively from block 306, where another AP in the currently selected candidate deployment batch may be selected for batch refinement processing. On the other hand, a positive determination at block 314 indicates that the batch refinement processing is complete for the selected candidate deployment batch. The selected candidate deployment batch is now a refined deployment batch to which corresponding configuration updates may be deployed, at block 316. In some aspects, the configuration updates may be deployed to the refined deployment batch while batch refinement processing is still underway for subsequent candidate deployment batches. In other aspects, the batch refinement processing may first be performed on all candidate deployment batches formed from the initial set of APs, and potentially on any additional candidate deployment batch(es) formed from APs added to the re-order list, prior to initiating deployment of configuration updates to any refined deployment batch.

At block 318, a determination is made as to whether batch refinement processing has been completed for all candidate deployment batches. In response to a positive determination at block 318, the method 300 may end. In response to a negative determination at block 318 indicating that one or more candidate deployment batches have not yet been processed, the method 300 may proceed iteratively from block 304, where the next candidate deployment batch may be selected for batch refinement processing. The method 300 may proceed iteratively in the above-described manner until all candidate deployment batches have been refined so as to ensure that no neighbor AP is in a same deployment batch as an AP to which a high-risk configuration will be deployed.

Figure 4:
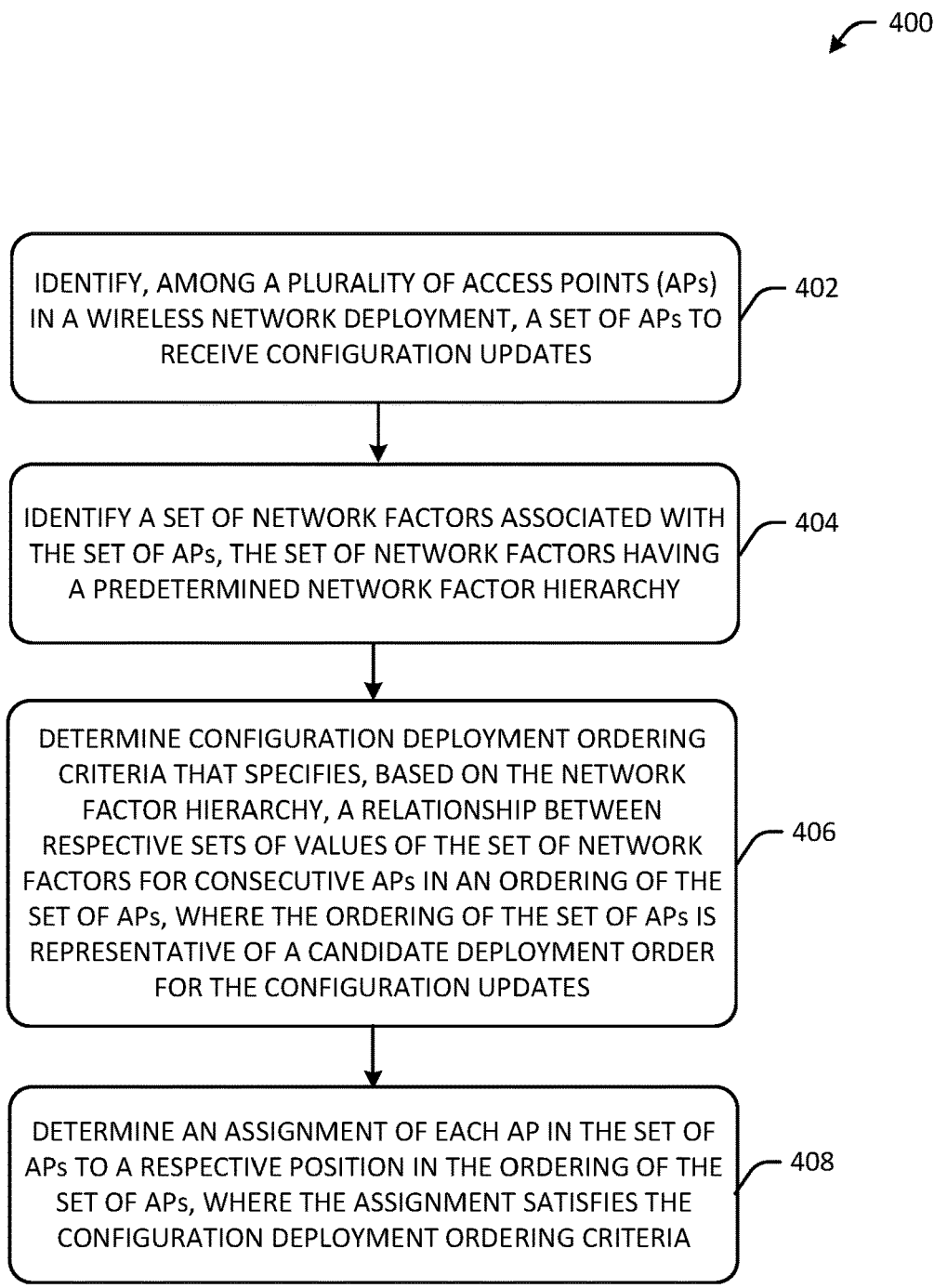
FIG. 4 is a flowchart of an illustrative method for determining a candidate deployment order for a set of AP configuration updates that may include one or more high-risk configuration updates according to example aspects of the disclosed technology.

An illustrative method 400 for determining a candidate deployment order for a set of configuration updates will now be described with reference to FIG. 4. In some aspects, the candidate deployment order module 124 may be configured to perform operations of the method 400. At block 402 of the method 400, a set of APs designated to receive configuration updates may be identified among a plurality of APs in a wireless network deployment. At block 404 of the method 400, a set of network factors associated with the set of APs may be identified. In some aspects, the set of network factors may have a predetermined hierarchy associated therewith.

Figure 5:
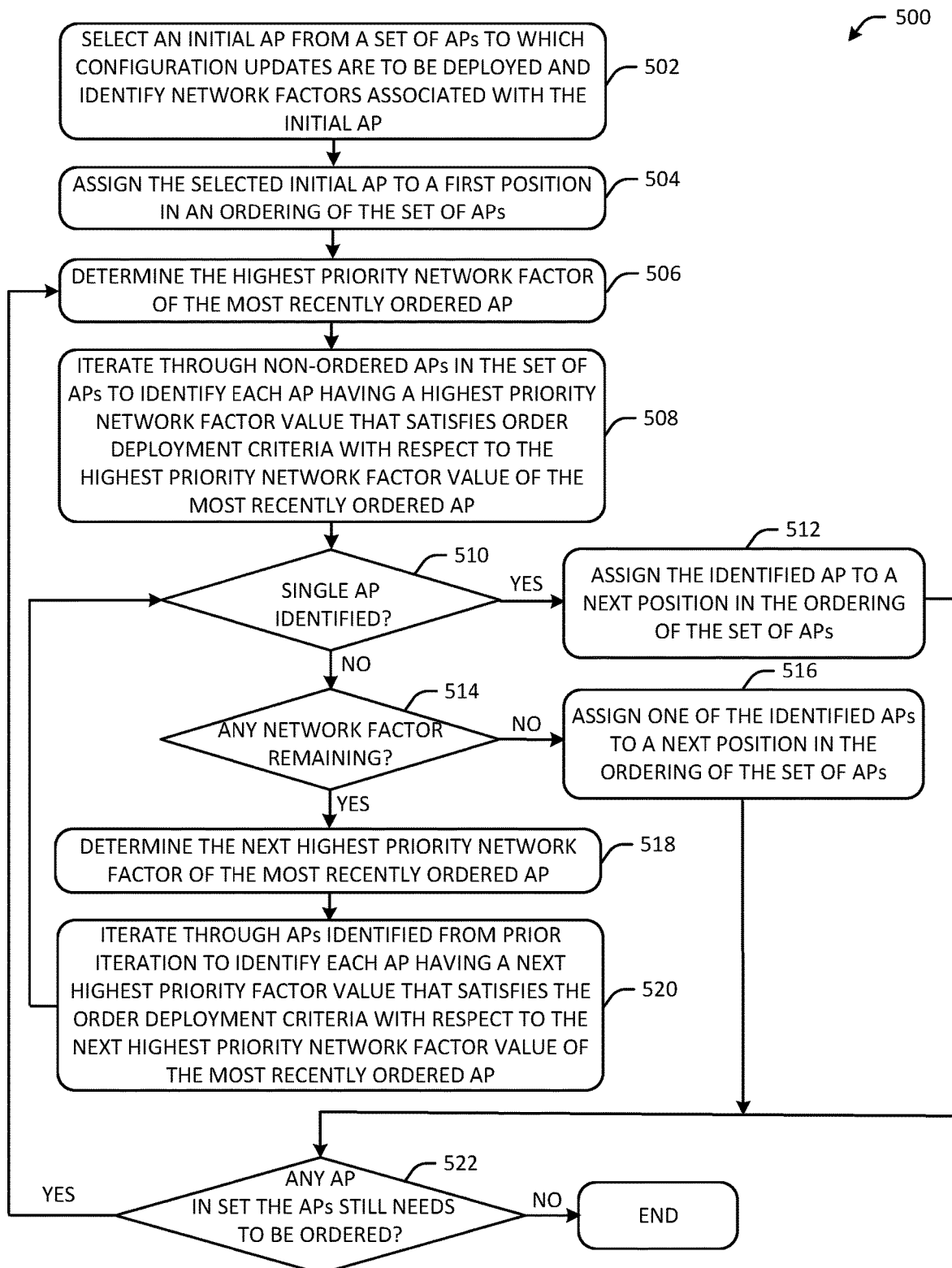
FIG. 5 is a flowchart of an illustrative method for executing an order-deploy algorithm to determine a candidate deployment order for a set of AP configuration updates that may include one or more high-risk configuration updates according to example aspects of the disclosed technology.
Figure 6:
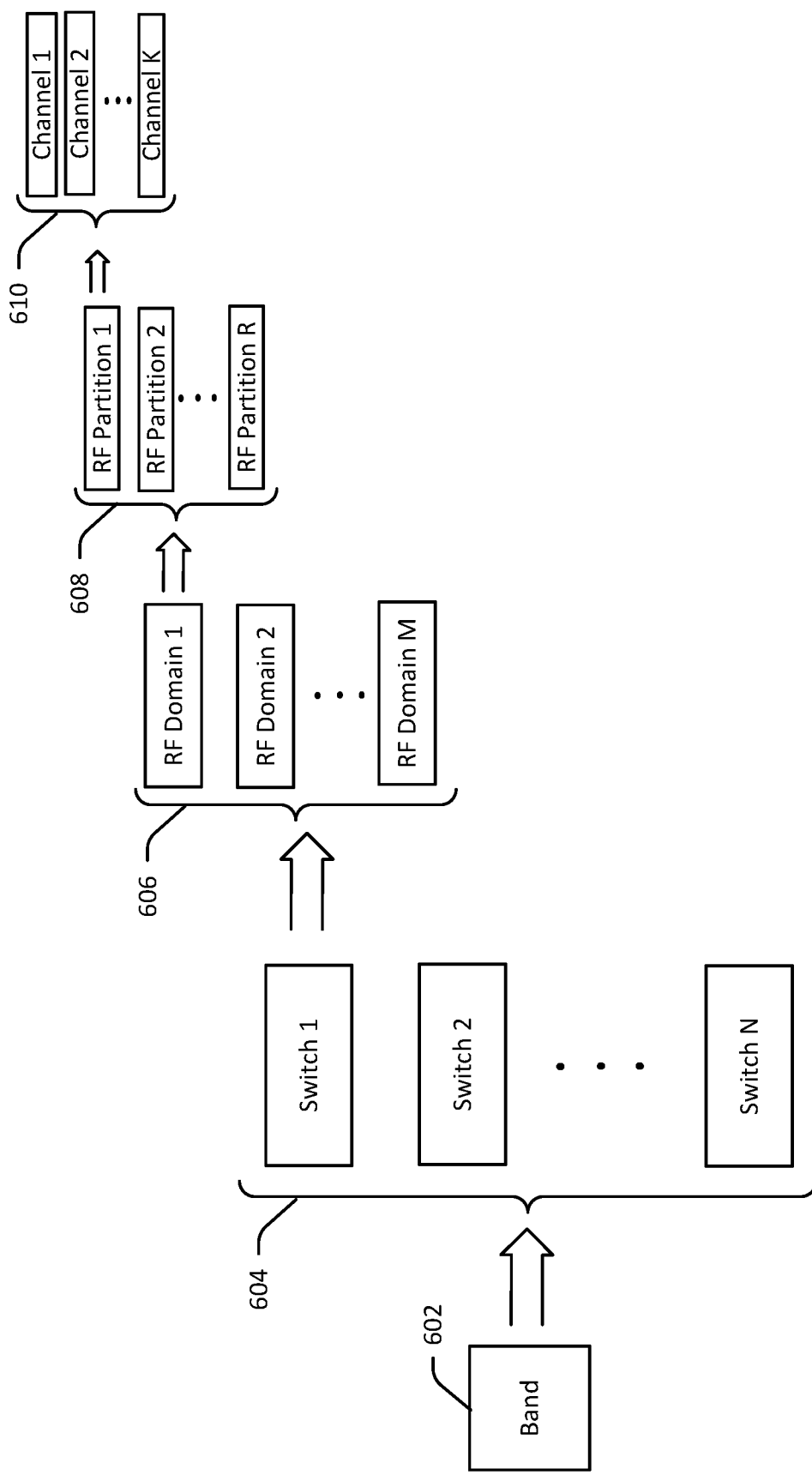
FIG. 6 schematically depicts a hierarchy of network factors according to example aspects of the disclosed technology.

FIG. 6 depicts an example network factor hierarchy in accordance with example aspects of the disclosed technology. In example aspects, the method 400 for determining a candidate deployment order, and in a specific implementation, the order-deploy algorithm represented in the flowchart of FIG. 5, may derive the deployment order based on the hierarchy of network factors in combination with configuration deployment ordering criteria. The deployment ordering criteria may specify desired relationships between network factor values for APs that are ordered together in a same deployment batch in order to mitigate the chances of AP radios that are not spatially distant from one another entering a configuration state concurrently.

The network factors in the example network factor hierarchy depicted in FIG. 6 include RF band 602, switch 604 (also referenced herein as switch IP), RF domain 606, RF partition 608, and channel 610. In some aspects, the network factors may go from higher priority to lesser priority in the hierarchy when moving from left to right in FIG. 6. That is, RF band 602 may be the highest priority network factor and RF channel 610 may be the lowest priority network factor. In some aspects, the configuration deployment ordering criteria may operate to decide the candidate deployment order in such a way that two AP radios that are associated with the same switch 604, in the same RF domain 606, and/or in the same RF partition 608 are placed far enough from one another in the deployment order so as not to be grouped into the same deployment batch. In addition, the configuration deployment ordering criteria may further operate to place AP radios operating in the same band and/or on the same channel together in the deployment order so as enhance the likelihood that they are grouped into the same deployment batch. Stated another way, the configuration deployment ordering criteria may operate to place those AP radios that have different network factor values for switch 604, RF domain 606, and/or RF partition 608 (indicating that the AP radios are not in the same switch, RF domain, and/or RF partition) close to each other in the deployment order, and to place those AP radios operating in different bands and/or on different channels away from each other in the deployment order.

With respect to the band 602 network factor, most APs currently operate their radios in two bands (2.4 GHz and 5 GHz). Aspects of the disclosed technology, however, are extendable to any number of additional bands such as the newly introduced 6 GHz band. In some aspects, an AP may include multiple radios capable of simultaneously operating in multiple RF bands such as the 2.4 and 5 GHz bands. If, for example, a first radio of an AP operating in a first band and a second radio of the AP operating in a second band receive deployments of configuration updates simultaneously, and thus, become non-operational for some period of time simultaneously, a coverage hole is likely to occur, particular if the AP has no neighbor APs. Thus, a delay between the configuration deployment for the first radio and the configuration deployment for the second radio is desirable. The illustrative order deployment method 400 and a particular implementation of that method in the form of an order-deploy algorithm achieve this by ordering AP radios operating in the same band together such that their configurations are deployed together, thereby providing the desired delay between configuration deployments to AP radios operating in different bands.

As depicted in FIG. 6, the next highest network factor in the hierarchy after band 602 may be the switch 604 network factor. In some aspects, the switch network factor 604 may refer to a mobility device, and the value for this network factor may be an IP address of a mobility device. A mobility device may assist with sending configurations to APs that are spatially proximal to one another. In some aspects, a mobility conductor may be provided that serves multiple mobility devices at different locations.

The next highest priority network factor in the hierarchy after switch 604 may be RF domain 606. In some aspects, each switch (e.g., mobility device) may include multiple RF domains 606. For instance, switch 1 is illustratively depicted in FIG. 6 as including RF domains 1 to M. An RF domain may refer to an RF area in which any two APs have at least one link there between, meaning that the APs are observable to each other. An RF domain may be constructed from neighbor data collected from APs. The weight of a link between two APs may be the amount of pathloss between the APs. Thus, the lower the pathloss between two APs, the more visible they are to each other, and as a result, the stronger the link between them.

The next highest priority network factor in the hierarchy after RF domain 606 may be RF partition 608. An RF partition 608 may be a subset of RF domain 606. In particular, in some aspects, an RF domain 606 may include multiple RF partitions (e.g., RF partitions 1 to R). In some aspects, the weakest link(s) between two APs in an RF domain 606 may be broken to form two or more RF partitions 608. For instance, in an example campus network deployment, the overall campus may be an RF domain 606, while a particular building in the campus may be an RF partition 608.

The lowest priority network factor in the example hierarchy depicted in FIG. 6 is the channel network factor 610. In some aspects, an AP radio may be assigned to operate on one of a plurality of channels. Each RF band 602 may include multiple channels 610. As previously described, an AP may switch to another operating channel for any of variety of reasons. Also as previously described, an AP may become non-operational for a CAC time period after a channel switch, which could lead to a coverage hole. The illustrative order deployment determination method 400 and the order-deploy algorithm implementation embodied in the method 500 may order AP radios operating on a same channel together. As such, configuration updates for AP radios on the same channel are deployed together, and because AP radios on the same channel are likely to be located far apart from one another by virtue of channel assignment algorithms that assign AP radios that are spatially distant from one another to a same channel, the likelihood that AP radios close to one another become concurrently non-operational due to configuration deployments is mitigated.

Figure 7:
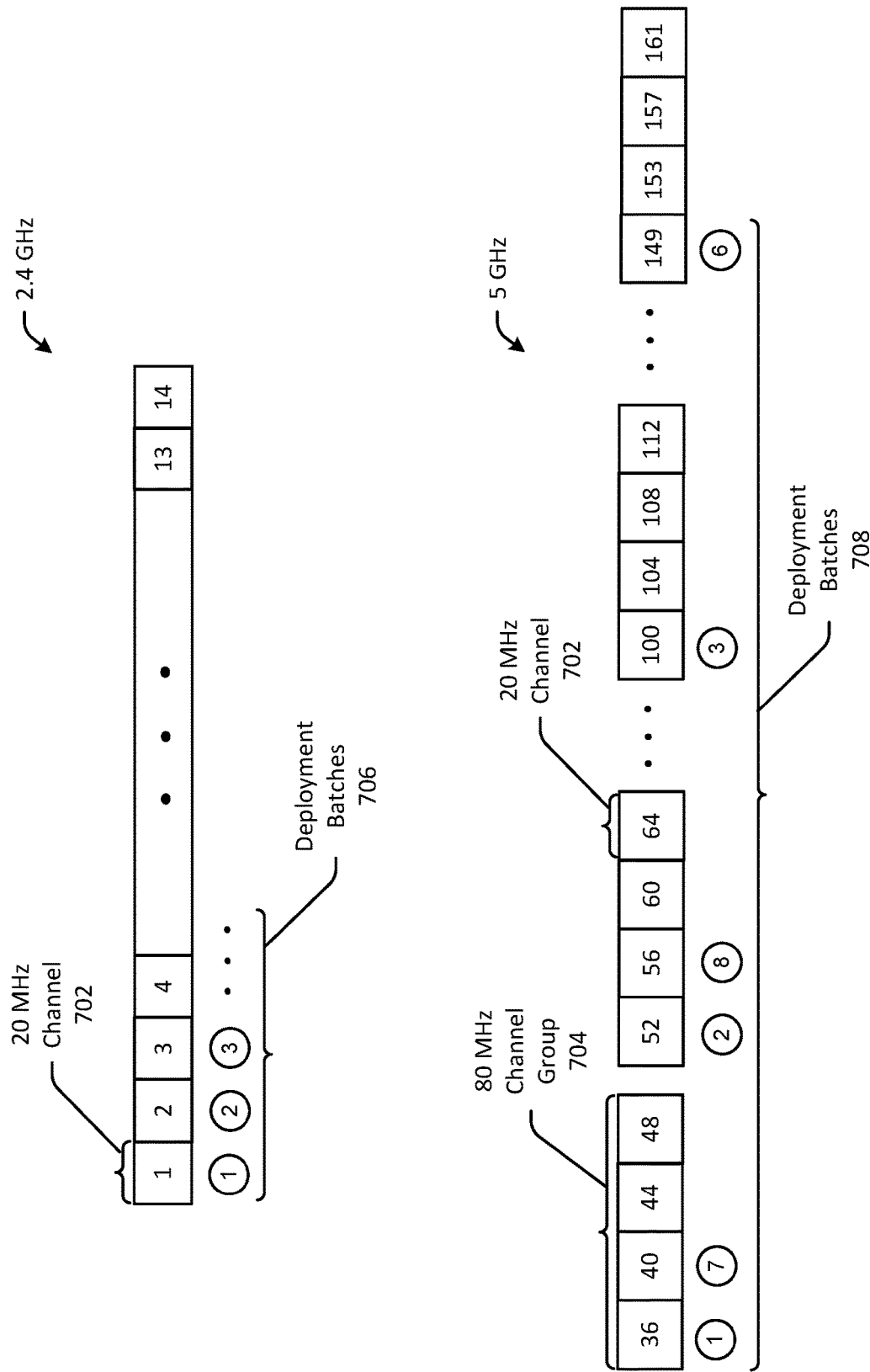
FIG. 7 schematically depicts an example deployment order for AP configuration updates, where the deployment order is determined based on a channel network factor according to example aspects of the disclosed technology.

FIG. 7 schematically depicts an example deployment order for AP configuration updates, where the deployment order is determined based on a channel network factor according to example aspects of the disclosed technology. While the 2.4 and 5 GHz bands are illustratively depicted in FIG. 7, it should be appreciated that the example deployment order described with reference to FIG. 7 can be extended to any RF band that is now available for use or which may become available in the future. FIG. 7 depicts example channels 702 in the 2.4 GHz band and example channel groups 704 in the 5 GHz band. In some aspects, each 2.4 GHz band channel 702 may be 20 MHz in width, while each 5 GHz band channel group 704 may include four 20 MHz channels, thereby providing 80 MHz of bandwidth for a given channel group 704. A set of deployment batches 706 are shown for the 2.4 GHz band and a set of deployment batches 708 are shown for the 5 GHz band. Referring first to the 2.4 GHz band, an order-deploy algorithm may assign each AP radio operating on channel 1 to a first deployment batch, each AP radio operating on channel 2 to a second deployment batch, and so on.

Within the 5 GHz band, AP radios operating on a given 20 MHz channel 702 (e.g., channel 36) may be similarly grouped into their own deployment batch 708. However, in contrast to the 2.4 GHz band scenario, configuration updates may not be deployed in consecutive deployment batches for adjacent 20 MHz channels. Rather, AP radios operating on a primary channel (e.g., channel 36, channel 52, etc.) of a higher-channel bandwidth channel group 704 may be grouped into adjacent deployment batches 708 in the deployment order. More specifically, each 80 MHz channel group 704 can be viewed as a concatenation of four 20 MHz channels 702. The order-deploy algorithm may assign all AP radios operating on a primary 20 MHz channel 702 of a first 80 MHz channel group 704 to a first deployment batch 708, all AP radios operating on a primary 20 MHz channel 702 of a second 80 MHz channel group 704 to a second deployment batch, and so on. Further, after a deployment order has been established for all primary 20 MHz channels, the order-deploy algorithm may proceed to iterate through secondary channels 702 (e.g., channel 40, channel 56, etc.) of each 80 MHz channel group 704 and assign AP radios operating on these secondary channels 702 to respective deployment batches 708. The order-deploy algorithm may continue in this fashion for the tertiary channels and the quaternary channels of each channel group 704 as well. In this manner, configuration deployments can be temporally distributed evenly among the various channels of a given channel group. Moreover, the order deployment scheme can be extended to any other higher-channel bandwidth in any RF band.

Returning now again to FIG. 4, at block 406 of the method 400, the candidate deployment order module 124 may determine configuration deployment ordering criteria that specifies, based on the network factor hierarchy, a relationship between respective sets of values of the set of network factors for consecutive APs in the an ordering of the set of APs, where the ordering of the set of APs is representative of a candidate deployment order for the configuration updates to be deployed to the set of APs. Then, at block 408 of the method 400, the candidate deployment order module 124 may determine an assignment of each AP in the set of APs to a respective position in the ordering of the set of APs, where the assignment satisfies the configuration deployment ordering criteria. As previously described, in some aspects, the configuration deployment ordering criteria may operate to place those AP radios that have different network factor values for switch 604, RF domain 606, and/or RF partition 608 (indicating that the AP radios are not in the same switch, RF domain, and/or RF partition) close to each other in the deployment order, and to place those AP radios operating in different bands and/or on different channels away from each other in the deployment order.

A specific implementation of the method 400 will now be described with respect to FIG. 5, which is a flowchart of an illustrative method 500 for executing an order-deploy algorithm to determine a candidate deployment order. In some aspects, the candidate deployment order module 124 may be configured to perform one or more operations of the method 500. At block 502 of the method 500, an initial AP may be selected from a set of APs to which configuration updates are to be deployed. Further, at block 502, network factors associated with the initially selected AP are identified. The network factors may include the example network factors (e.g., band, switch, RF domain, RF partition, and channel) arranged in accordance with the network factor hierarchy shown in FIG. 6.

At block 504 of the method 500, the selected initial AP is assigned to a first position in an ordering of the set of APs. Then, at block 506 of the method 500, the highest priority network factor of the most recently ordered AP may be determined. For the network factor hierarchy of FIG. 6, for example, the highest priority network factor is RF band. At block 508 of the method 500, the candidate deployment order module 124 may iterate through the APs that have yet to be ordered to identify each un-ordered AP having a highest priority network factor value that satisfies order deployment criteria with respect to the highest priority network factor value of the most recently ordered AP. For example, referring to the network factor hierarchy of FIG. 6, if the RF band for the initially selected AP is 2.4 GHz, then the module 124 may identify each un-ordered AP operating in the same RF band as the initially selected AP.

At block 510, in a first iteration of the method 500, a determination may be made as to whether a single AP was identified at block 508. In response to a positive determination at block 510 indicating that a single AP was identified at block 508 (i.e., a single AP operating in a same band as the initially selected AP), the method 500 may proceed to block 512, where the single identified AP may be assigned to a next available position in the ordering of the set of APs, which is a second position in the ordering during this first iteration of the method 500. On the other hand, in response to a negative determination at block 510 indicating that multiple APs were identified at block 508, the method 500 may proceed to block 514, where a determination may be made as to whether any network factor remains to be considered. In the event of a negative determination at block 514 indicating that there are no remaining network factors to be considered (i.e., all network factors in the hierarchy have been evaluated), the method may proceed to block 516, where one of the APs identified at block 508 may be assigned to the next available position (which is the second position during the first iteration of the method 500). In some aspects, the AP may be arbitrarily selected.

For instance, the first AP determined to satisfy the configuration deployment ordering criteria at block 508 may be selected for assignment to the second position in the ordering at block 516 (during a first iteration of the method 500). In other aspects, the AP selected for assignment to the ordering of APs at block 516 may be one that meets the deployment criteria with respect to a greatest number of network factors. For example, the AP assigned to the ordering at block 516 may be one that operates in a same RF band and RF channel as the most recently ordered AP, but has different values than the most recently ordered AP (i.e., the initially selected AP during the first iteration of the method 500) for switch IP, RF domain, and RF partition.

In the event of a positive determination at block 514 indicating that there remain network factor(s) in the hierarchy to be evaluated, the order-deploy algorithm may determine the next highest priority network factor to be evaluated in the hierarchy. With respect to the example hierarchy of FIG. 6, the next highest priority network factor after the highest priority network factor (RF band) may be switch IP. Then, at block 520, the candidate deployment order module 124 may iterate through the APs identified from the evaluation of a prior network factor (e.g., the immediately prior, higher priority network factor) to identify each AP having a next highest priority network factor value that satisfies the order deployment criteria with respect to the next highest priority network factor value of the most recently ordered AP. For example, the APs identified from the prior iteration may be assessed to determine which ones have switch IP values that satisfy configuration update deployment criteria with respect to the switch IP of the most recently ordered AP (e.g., the initially selected AP). In some aspects, the APs that satisfy the deployment criteria may be those that have switch IP values that differ from the switch IP for the most recently ordered AP.

From block 520, the method 500 may return to block 510. The determination at block 510 may again be made to determine whether a single AP or multiple APs were identified at block 520. In the event that a single AP was identified or multiple APs were identified but all network factors have been exhausted, the method 500 may assign the single identified AP or a selected one of the multiple identified APs to the AP ordering. In the case that multiple APs are again identified at block 520 during this current iteration of the method 500, and the network factors have not been exhausted, a next highest priority network factor (e.g., RF domain) may be identified at block 518, and the module 124 may iterate, at block 520, through the APs identified from the prior iteration that evaluated switch IP to identify those APs that have, for example, RF domain values that differ from the RF domain value of the most recently ordered AP. From block 520, the method 500 may again proceed iteratively from block 510. The order-deploy algorithm 500 may continue in this iterative manner until a single AP is identified that meets the configuration update deployment criteria or until all network factors are exhausted. For the example network factor hierarchy of FIG. 6, the order-deploy algorithm 500 would continue beyond RF domain to also evaluate RF partition, and if necessary, channel as long as multiple APs satisfying the deployment criteria are identified with respect to the particular network factor being evaluated at that iteration.

From either of blocks 512 or 516, the method 500 may proceed to block 522, where a determination may be made as to whether any AP in the set of APs still needs to be placed in the ordering. In response to a negative determination at block 522, the method 500 ends. In response to a positive determination at block 522, the method 500 proceeds iteratively from block 506, where a highest priority network factor of the most recently ordered AP.

A non-limiting example of how the order-deploy algorithm operates will now be described with respect to the example network deployment information in the table below.

| AP radio | RF Partition ID | Channel # | Order Position |
|----------|-----------------|-----------|----------------|
| a | 1 | 1 | 1 |
| b | 1 | 1 | 3 |
| c | 1 | 6 | 5 |
| d | 1 | 6 | 7 |
| e | 2 | 1 | 2 |
| f | 2 | 1 | 4 |
| g | 2 | 6 | 6 |
| h | 2 | 6 | 8 |

In this example, 8 AP radios are being ordered and there are two network factors in the hierarchy: RF partition and channel. In some aspects, the order-deploy algorithm begins by selecting an initial AP radio from the set of AP radios and ascertaining its network factors/network factor values. For instance, AP radio a may be selected and assigned to the first position in the an ordering. Then, all the APs that satisfy deployment criteria with respect to the highest priority network factor (RF partition in this example) are identified. In this example, that includes all un-ordered APs who RF partition ID is 2 because the deployment criteria seeks to order APs with different RF partitions together. This includes APs e, f, g, and h.

Because multiple candidate APs have been identified, a negative determination is made at block 510 of the method 500. Further, because all network factors have not yet been exhausted, a positive determination is made at block 514. The order-deploy algorithm then proceeds to block 518, where the next highest priority network factor is determined, which in this example, is the channel network factor. Because the order-deploy algorithm seeks to place AP radios operating on the same channel together in the deployment order, the algorithm selects AP, at block 520, radios e and f when iterating through the subset of APs identified during the prior iteration that involved evaluating the RF partition network factor.

At this point, the method 500 again returns to block 510, where a negative determination is made because two AP radios (e and f) were identified as satisfying the configuration deployment ordering criteria during the last iteration of the algorithm. It should be appreciated that an iteration of the order-deploy algorithm may refer to processing performed with respect to a particular network factor to identify AP(s) that satisfy the order deployment criteria relating to that network factor vis-à-vis the most recently ordered AP. Alternatively, an iteration of the order-deploy algorithm may refer to the overall processing performed to assign an AP radio to a position within a candidate deployment order.

Referring again to the current example, a negative determination is made at block 514 because all network factors (2 in this example) have been exhausted. As such, one of the identified APs (e or f) is selected to assign to a next position in the ordering of the set of APs. In some aspects, the selection may be made arbitrarily. In other aspects, the first AP that was identified among the subset of candidate APs (AP e) may be selected. In yet other aspects, other characteristics of the candidate APs may be evaluated to determine the selection. For instance, the AP with more neighbor APs, the AP serving fewer client devices, or the like may be selected at block 514. It should be appreciated that the above-described example is merely illustrative. The number of APs in the initial set of APs to be ordered may vary, the number and/or type of network factors considered may vary, the network factor values for the APs may vary, and so forth.

In example aspects, the order-deploy algorithm may proceed iteratively as described above, ultimately resulting in the following ordering of the set of APs: a, e, b, f, c, g, d, h. If we assume a deployment batch size of 2 and no high-risk configuration updates then the configuration updates may be pushed to the APs as follows: deployment batch 1 (a, e)→configurable delay→deployment batch 2 (b, f)→configurable delay→deployment batch 3 (c, g)→configurable delay→deployment batch 4 (d, h). In this example, the batch refinement processing did not result in any changes to the candidate deployment batches because none of the configuration updates being deployed were high-risk configurations.

Figure 8:
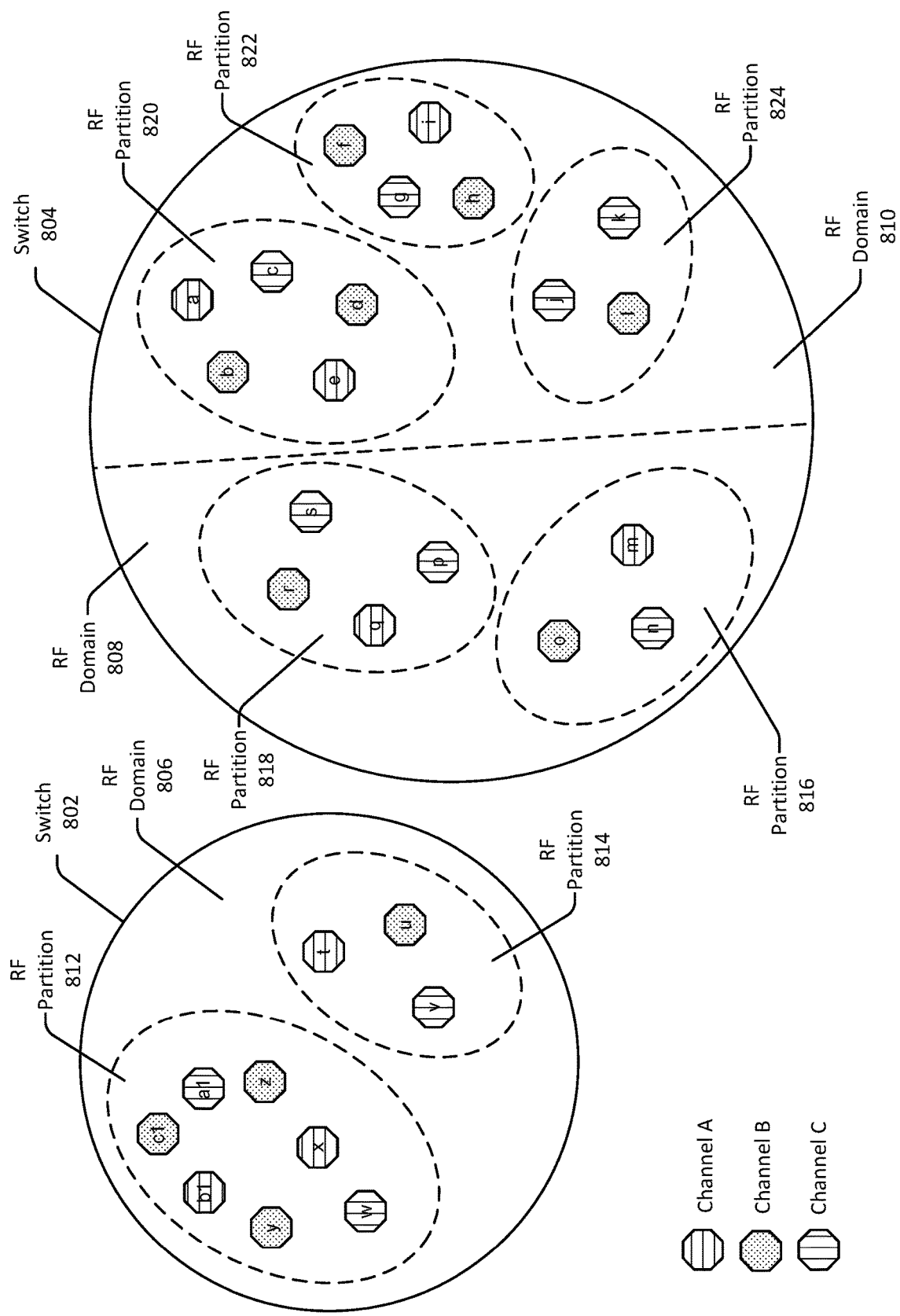
FIG. 8 schematically depicts an example wireless network deployment for which an AP configuration update deployment order can be determined using an order-deploy algorithm and batch deployment processing techniques in accordance with example aspects of the disclosed technology.

FIG. 8 schematically depicts a portion of an example wireless network deployment. The overall process disclosed herein for determining a candidate deployment order for deploying configuration updates to a set of APs (where at least one of the configurations is high-risk), grouping the ordered set of APs into candidate deployment batches, performing batch refinement processing on the candidate deployment batches, and ultimately deploying the configurations in accordance with the refined deployment batches will be described with reference to the example deployment of FIG. 8.

The portion of the network deployment depicted in FIG. 8 may be that portion of the deployment that includes APs designated to receive configuration updates. It should be appreciated that what is shown in FIG. 8 may be part of larger, potentially much larger, network deployment that includes hundreds or thousands of APs and any number of switches, RF domains, RF partitions, or the like. Two switches 802 and 804 are schematically depicted in FIG. 8. As previously noted, each of switches 802, 804 may be a mobility device that manages a particular collection of APs that are close to one another in the deployment and assists in pushing configuration updates to the APs it manages.

Switch 802 may include a single RF domain 806, which in turn, includes two RF partitions—RF partition 812 and RF partition 814. Switch 804 may include two RF domains—RF domain 808 and RF domain 810. RF domain 808 may include RF partitions 816 and 818. RF domain 810 may include RF partitions 820, 822, and 824. Various APs are depicted within each RF partition. Each AP is illustratively depicted as operating on one of three channels—channel A, channel B, or channel C. As previously noted, each RF partition may be formed by splitting the APs within a given RF domain at the point of a corresponding weakest link between any two APs within the RF domain. The strength/weakness of the link between APs may be determined based on an amount of pathloss there between. While client devices are not shown in FIG. 8 for simplicity of depiction, it should be appreciated that the depicted APs may serve any suitable number of client devices.

Assume, for this example, that the order-deploy algorithm disclosed herein was executed to determine a candidate deployment order for deploying configuration updates to the set of AP radios depicted in FIG. 8. Assume that the candidate deployment order is as follows, where the candidate deployment order is reflected in an ordering of the AP radios: a, t, q, x, i, u, m, b1, I, v, r, y, e, z, o, c1, f, w, p, a1, j, n, b, s, h, k, d, g, c. Assume further that AP radios y and d have been flagged as designated to receive high-risk configuration updates. Assume still further that the predetermined deployment batch size is 5 given that this is a relatively larger deployment.

In example aspects, the AP radio ordering shown above may be grouped into the following candidate deployment batches: candidate deployment batch 1: a, t, q, x, i; candidate deployment batch 2: u, m, b1, I, v; candidate deployment batch 3: r, y, e, z, o; candidate deployment batch 4: c1, f, w, p, a1; candidate deployment batch 5: j, n, b, s, h; candidate deployment batch 6: k, d, g, c. Batch refinement processing may then be performed on these candidate deployment batches. Deployment batch 1 has no AP radios that are flagged as receiving a high-risk configuration, and as such, may remain unchanged after batch refinement processing. Thus, respective configuration updates may be deployed simultaneously or substantially simultaneously to the AP radios a, t, q, x, i in deployment batch 1. A configurable predetermined delay period t1 may then be introduced after deployment of deployment batch 1. Deployment batch 2 similarly does not include an high-risk flagged AP radio, and thus, may also remain unchanged after the batch refinement processing. Therefore, respective configuration updates may be deployed simultaneously or substantially simultaneously to the AP radios u, m, b1, I, v in deployment batch 2 after the delay period t1 expires. After deployment of configurations to deployment batch 2, another configurable predetermined delay period t2 may be introduced. In some aspects, t2 may be the same duration as t1 or of a different duration.

Candidate deployment batch 3 (r, y, e, z, o), however, includes a high-risk flagged AP radio (AP radio y). As such, the batch refinement processing may determine if there are any neighbor AP radio(s) to the flagged AP radio. In this example, AP radio z is a neighbor AP radio to AP radio y because they are contained in the same RF partition (RF partition 812). As previously noted, either the flagged AP radio or the neighbor AP radio may be removed from the candidate deployment batch and placed in a re-order list. In this example, the neighbor radio z is removed from candidate deployment batch 3 and placed in the re-order list. The refined deployment batch corresponding to candidate deployment batch 3 then becomes r, y, e, o. Respective configuration updates are then deployed to AP radios in the refined deployment batch 3 after the delay period t2 elapses. Deployment of configurations to refined deployment batch 3 may be followed by another delay period t3, which may be the same duration as t1 and/or t2 or a different duration. Although not part of this example, as previously noted, an AP radio from an adjacent candidate deployment batch that is not a neighbor AP radio to any radio in the refined deployment batch 3 (e.g., AP radio f or p) may be added to the deployment batch to bring its size back up to the original predetermined batch size of 5.

The next two candidate deployment batches—candidate deployment batch 4 (including AP radios c1, f, w, p, a1) and candidate deployment batch 5 (including AP radios j, n, b, s, h)—remain unchanged after batch refinement processing because of the absence of any AP radios flagged as high-risk. Thus, respective configuration updates may be deployed to deployment batch 4 after delay period t3 elapses. Then, another delay period t4 may be introduced, which again, may be the duration as any previous delay period or a different duration. After delay period t4 elapses, respective configuration updates may be deployed to candidate deployment batch 5, followed by a delay period t5, which may be the same duration as any previous delay period or a different duration.

The last candidate deployment batch remaining at this stage is candidate deployment batch 6 containing AP radios k, d, g, c. In addition, AP radio z is in the re-order list. Upon performing batch refinement processing on candidate deployment batch 6, AP radio d is identified as a flagged AP, and AP radio c is identified as a neighbor AP to AP radio d by virtue of being in the same RF partition (RF partition 820). In this example implementation, AP radio c is removed from candidate deployment batch 6 and placed in the re-order list; however, as previously noted, the flagged AP d may alternatively be removed from the deployment batch. Respective configuration updates are then deployed to the remaining AP radios in refined deployment batch 6 (i.e., AP radios k, d, g).

The order-deploy algorithm may then be executed on the AP radios z and c in the re-order list to obtained the ordered set (c, z). Because these AP radios are not neighbor APs, they can then receive their respective configurations as part of the same deployment batch. In some aspects, a longer delay period t7 than any of the prior delay periods may be introduced between deployment of configuration updates to deployment batch 6 (the last deployment batch not containing AP radios from the re-order list) and deployment of configuration updates to the deployment batch formed from the AP radios in the re-order list. For instance, each of delay periods t1-t6 may on the order of seconds, while delay period t7 may be on the order of minutes. That is, in some aspects, delay period t7 may be some multiple of one of the prior delay periods t1-t6.

The table below provides an indication of the network factor values for the various AP radios in the example scenario of FIG. 8 and an indication of the ordering that results from executing the order-deploy algorithm on the set of APs as well as brief descriptions of how the order-deploy algorithm operates to select AP radios to place in the ordering. It should be appreciated that these are merely example network factor values for the APs and that other network factor values may result in a same ordering or a different ordering. Channels A, B, and C from FIG. 8 correspond to channels 1, 6, and 11, respectively, in the table below.

| Rank | Band | Switch | RF domain | RF partition | Channel | AP radio (in order decided by order-deploy algorithm) | Brief Description of Algorithm Operation |
|---|---|---|---|---|---|---|---|
| 1 | 2.4 GHz | 1 | 1 | 1 | 1 | a | Initially selected AP radio. |
| 2 | 2.4 GHz | 2 | 3 | 1 | 1 | t | Keeping the same band; choosing radio from another switch |
| 3 | 2.4 GHz | 1 | 2 | 1 | 1 | q | Toggle to switch1, but RF domain is 2 (because a radio from RF domain 1 already placed at rank #1) |
| 4 | 2.4 GHz | 2 | 3 | 2 | 1 | x | Toggle to switch 2, RF domain 3 (since it has only one RF domain), but choose radio from RF partition 2 (as radio from RF partition 1 already placed in rank #2) |
| 5 | 2.4 GHz | 1 | 1 | 2 | 1 | i | Toggle to switch 1, toggle to RF domain 1. Choose a radio from RF partition 2 (since a radio from RF partition 1 placed in rank #1) |
| 6 | 2.4 GHz | 2 | 3 | 1 | 6 | u | All radios with channel 1 were already ordered in that RF partition, so move to radio operating on channel 6. |
| 7 | 2.4 GHz | 1 | 2 | 2 | 1 | m | |
| 8 | 2.4 GHz | 2 | 3 | 2 | 1 | b1 | |
| 9 | 2.4 GHz | 1 | 1 | 3 | 6 | l | |
| 10 | 2.4 GHz | 2 | 3 | 1 | 11 | v | All radios operating on channels 1 and 6 have already been ordered in that RF partition, so move to radio operating on channel 11. |
| 11 | 2.4 GHz | 1 | 2 | 1 | 6 | r | |
| 12 | 2.4 GHz | 2 | 3 | 2 | 6 | y | |
| 13 | 2.4 GHz | 1 | 1 | 1 | 1 | e | |
| 14 | 2.4 GHz | 2 | 3 | 2 | 6 | z | |
| 15 | 2.4 GHz | 1 | 2 | 2 | 6 | o | |
| 16 | 2.4 GHz | 2 | 3 | 2 | 6 | c1 | |
| 17 | 2.4 GHz | 1 | 1 | 2 | 6 | f | |
| 18 | 2.4 GHz | 2 | 3 | 2 | 11 | w | |
| 19 | 2.4 GHz | 1 | 2 | 1 | 11 | p | |
| 20 | 2.4 GHz | 2 | 3 | 2 | 11 | a1 | |
| 21 | 2.4 GHz | 1 | 1 | 3 | 11 | j | |
| 22 | 2.4 GHz | 1 | 2 | 2 | 11 | n | Since all radios in switch 2 are already ordered, continue ordering radios in switch 1. |
| 23 | 2.4 GHz | 1 | 1 | 1 | 6 | b | |
| 24 | 2.4 GHz | 1 | 2 | 1 | 11 | s | |
| 25 | 2.4 GHz | 1 | 1 | 2 | 6 | h | |
| 26 | 2.4 GHz | 1 | 1 | 3 | 11 | k | All radios in switch 1 and RF domain 2 are ordered. Continue to order radios in switch 1 and RF domain 1. |
| 27 | 2.4 GHz | 1 | 1 | 1 | 6 | d | |
| 28 | 2.4 GHz | 1 | 1 | 2 | 11 | g | |
| 29 | 2.4 GHz | 1 | 1 | 1 | 11 | c | |

It should be appreciated that the above-described example is merely illustrative. In other example scenarios, the number of candidate deployment batches may be greater (or fewer), the batch size may be different, the number of flagged APs may be greater (or fewer), the number of AP radios added to the re-order list may be greater (or fewer), the number of deployment batches formed from the AP radios in the re-order list may be greater, and so forth. Numerous variations are within the scope of the disclose technology. For example, in those aspects involving a single AP deployment without any neighbor AP, a time period during which the AP radio is expected to serve less than a threshold number of client devices may be determined based on network traffic pattern analysis of historical usage of the particular AP radio. A respective configuration update may then be deployed to the AP radio during the time period.

It should be appreciated that any of the methods 200, 300, 400, or 500 may be performed responsive to execution, by one or more processors, of corresponding sets of machine-executable instructions stored in machine-readable storage media. The machine-executable instructions may be stored, for example, on machine-readable storage media of APs within a multi-AP enterprise network deployment, and may be executable by one or more processors of the APs to implement any of the methods disclosed herein. In other example aspects, the machine-executable instructions may be stored in machine-readable storage media accessible by a wireless network controller configured to manage, among other things, the deployment of configuration updates to APs within a network deployment. The wireless network controller may access and execute the machine-executable instructions to perform any of the methods disclosed herein.

In some aspects, the stored instructions may be modularized into one or more computing engines/program modules such as the modules depicted in FIG. 1B. Each such computing module may include a collection of machine-readable/machine-executable instructions, that when executed by a hardware processor, causes the hardware processor to perform corresponding tasks/processing. In some aspects, the set of tasks performed responsive to execution of the set of instructions forming a particular computing module may be a set of specialized/customized tasks for effectuating a particular type/scope of processing. The aforementioned modules can be implemented in any combination of hardware, software, and/or firmware. In some aspects, these modules may include customized computer-executable logic implemented within a customized computing machine such as a customized field programmable gate array (FPGA) or an application specific integrated circuit (ASIC).

Figure 9:
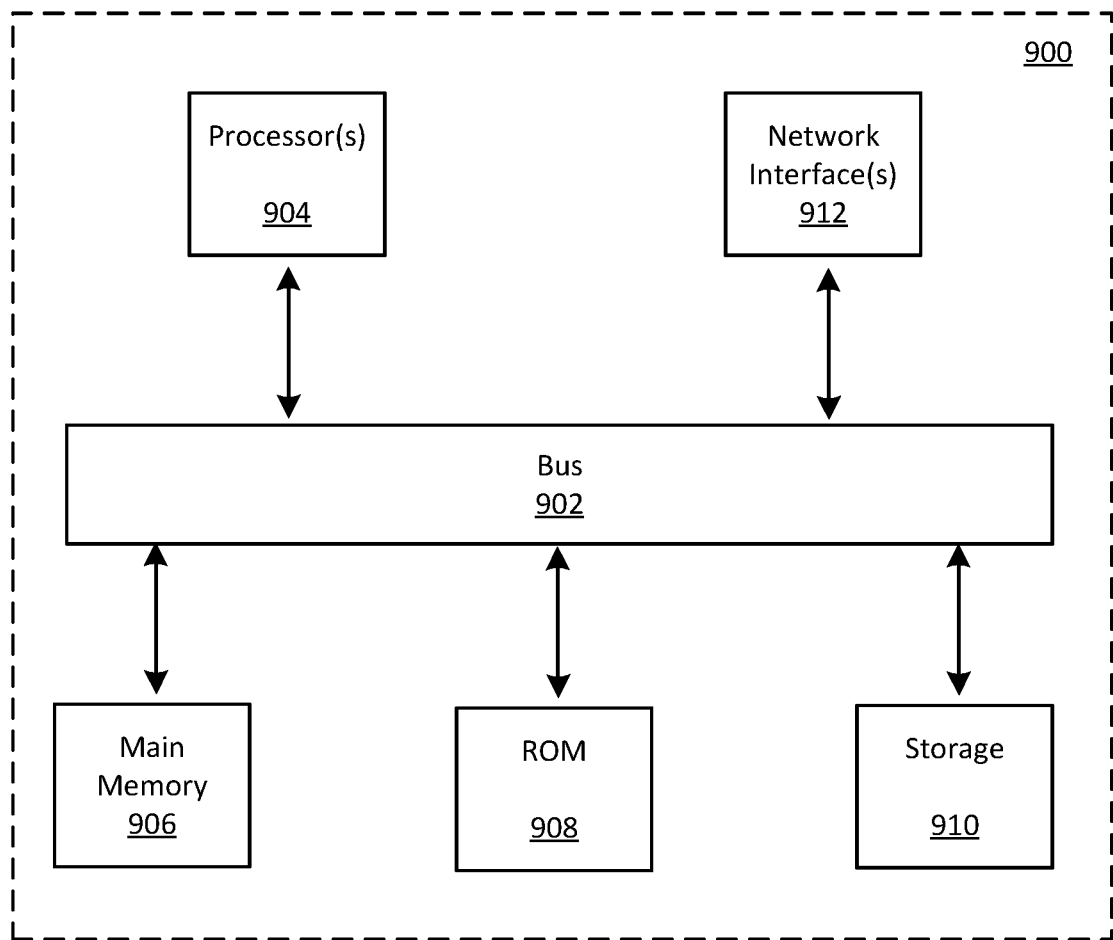
FIG. 9 is an example computing component that may be used to implement various features of example aspects of the disclosed technology.

FIG. 9 depicts a block diagram of an example computer system 900 in which various of the aspects described herein may be implemented. The computer system 900 includes a bus 902 or other communication mechanism for communicating information, one or more hardware processors 904 coupled with bus 902 for processing information. Hardware processor(s) 904 may be, for example, one or more general purpose microprocessors.

The computer system 900 also includes a main memory 906, such as a random access memory (RAM), cache and/or other dynamic storage devices, coupled to bus 902 for storing information and instructions to be executed by processor 904. Main memory 906 also may be used for storing temporary variables or other intermediate information during execution of instructions to be executed by processor 904. Such instructions, when stored in storage media accessible to processor 904, render computer system 900 into a special-purpose machine that is customized to perform the operations specified in the instructions.

The computer system 900 further includes a read only memory (ROM) 908 or other static storage device coupled to bus 902 for storing static information and instructions for processor 904. A storage device 910, such as a magnetic disk, optical disk, or USB thumb drive (Flash drive), etc., is provided and coupled to bus 902 for storing information and instructions.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 900 may implement the techniques described herein using customized hard-wired logic, one or more ASICs or FPGAs, firmware and/or program logic which in combination with the computer system causes or programs computer system 900 to be a special-purpose machine. According to one aspect, the techniques herein are performed by computer system 900 in response to processor(s) 904 executing one or more sequences of one or more instructions contained in main memory 906. Such instructions may be read into main memory 906 from another storage medium, such as storage device 910. Execution of the sequences of instructions contained in main memory 906 causes processor(s) 904 to perform the process steps described herein. For instance, instructions for implementing one or more of the methods 200, 300, 400, or 500 may be loaded from the storage device 910 and/or the ROM 908 into the main memory 906 for execution by the processor(s) 904 to perform the operations of said methods. In alternative aspects, hard-wired circuitry may be used in place of or in combination with software instructions.

The term "non-transitory media," and similar terms such as machine-readable storage media, as used herein, refers to any media that store data and/or instructions that cause a machine to operate in a specific fashion. Such non-transitory media may comprise non-volatile media and/or volatile media. Non-volatile media includes, for example, optical or magnetic disks, such as storage device 910. Volatile media includes dynamic memory, such as main memory 906. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 902. Transmission media can also take the form of acoustic or light waves, such as those generated during radio-wave and infra-red data communications.

The computer system 900 also includes a network interface 912 coupled to bus 902. Network interface 912 provides a two-way data communication coupling to one or more network links that are connected to one or more local networks. For example, network interface 912 may be an integrated services digital network (ISDN) card, cable modem, satellite modem, or a modem to provide a data communication connection to a corresponding type of telephone line. As another example, network interface 912 may be a local area network (LAN) card to provide a data communication connection to a compatible LAN (or WAN component to communicated with a WAN). Wireless links may also be implemented. In any such implementation, network interface 912 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through network interface 912, which carry the digital data to and from computer system 900, are example forms of transmission media.

The computer system 900 can send messages and receive data, including program code, through the network(s), network link and network interface 912. In the Internet example, a server might transmit a requested code for an application program through the Internet, the ISP, the local network and the network interface 912. The received code may be executed by processor 904 as it is received, and/or stored in storage device 910, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example aspects. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 900.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain aspects include, while other aspects do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent. Further, any description of a first thing/condition being "based" on a second thing/condition shall be construed as the first thing/condition being "based at least in part" on the second thing/condition.

What is claimed is:

1. A method for determining a deployment order for a set of configuration updates to a set of access points (APs), the method comprising:
    identifying a set of network factors associated with the set of APs comprising a first network factor and a second network factor;
    selecting a first AP from the set of APs;
    determining a first set of values of the set of network factors for the first AP;
    assigning the first AP to a first position in an ordering of the set of APs, wherein the ordering of the set of APs is representative of the deployment order for the set of configuration updates;
    determining configuration deployment ordering criteria that specifies, based on a network factor hierarchy of the set of network factors, a relationship between respective sets of values of the set of network factors for consecutive APs in the ordering of the set of APs;
    based on the configuration deployment ordering criteria, iterating through unassigned APs in the set of APs to identify a first subset of a plurality of APs that match a respective value of the first network factor for the first AP; and
    based on the configuration deployment ordering criteria, iterating through the first subset to identify a second subset of one or more APs having respective values of the second network factor that differ from the first AP.

2. The method of claim 1, wherein the set of network factors comprises two or more of: radio frequency (RF) band, an Internet Protocol (IP) address of a mobility device, an RF domain, an RF partition, or an RF channel.

3. The method of claim 1, wherein the set of network factors comprises a first network factor and a second network factor, the first network factor having a higher priority than the second network factor in the network factor hierarchy.

4. The method of claim 3, wherein the configuration deployment ordering criteria specifies that respective values of the first network factor match for consecutive APs in the ordering of the set of APs and that respective values of the second network factor differ for consecutive APs in the ordering of the set of APs.

5. The method of claim 4, wherein the first network factor is an RF band and the second network factor is one of an IP address of a mobility device, an RF domain, or an RF partition.

6. The method of claim 1, wherein iteratively executing the assignment algorithm to determine the assignment that satisfies the configuration deployment ordering criteria further comprises, for the first iteration:
  determining that the first subset comprises a single AP; and
  assigning the single AP to a second position in the ordering of the set of APs.

7. The method of claim 1, wherein iteratively executing the assignment algorithm to determine the assignment that satisfies the configuration deployment ordering criteria further comprises, for the first iteration:
  determining that the second network factor is a next highest priority factor after the first network factor in the network factor hierarchy.

8. The method of claim 7, further comprising:
  determining that the second subset comprises a plurality of APs;
  determining that all network factors in the set of network factors have been evaluated during the first iteration;
  assigning a selected AP from the second subset to a second position adjacent to the first position in the ordering of the set of APs.

9. The method of claim 1, further comprising:
  iteratively executing an assignment algorithm to determine an assignment of each unassigned AP in the set of APs to a respective position in the ordering of the set of APs, wherein the assignment satisfies the configuration deployment ordering criteria,
  wherein each iteration of the assignment algorithm ends upon on one or more assignment conditions being met, the one or more assignment conditions comprising i) a single AP being identified that satisfies the configuration deployment ordering criteria with respect to a current network factor being evaluated or ii) each network factor having been evaluated.

10. The method of claim 1, further comprising determining an assignment of each AP in the set of APs to a respective position in the ordering of the set of APs based on its respective subset.

11. The method of claim 10, further comprising deploying configuration updates to each AP in the set of APs based on the ordering of the set of APs.

12. A wireless network deployment, comprising:
  a plurality of access points (APs); and
  a wireless network controller comprising:
    a memory storing machine-executable instructions; and
    a processor configured to access the memory and execute the machine-executable instructions to:
      identify, among the plurality of APs, a set of APs to receive configuration updates;
      identify a set of network factors associated with a set of APs comprising a first network factor and a second network factor;
      determine configuration deployment ordering criteria that specifies, based on a network factor hierarchy of the set of network factors, a relationship between respective sets of values of the set of network factors for consecutive APs in an ordering of the set of APs, wherein the ordering of the set of APs is representative of the deployment order for the configuration updates; and
      based on the configuration deployment ordering criteria, iterate through unassigned APs in the set of APs to identify a first subset of a plurality of APs that match a respective value of the first network factor for a first AP;
      based on the configuration deployment ordering criteria, iterate through the first subset to identify a second subset of one or more APs having respective values of the second network factor that differ from the first AP; and
      determine an assignment of each AP in the set of APs to a respective position in the ordering of the set of APs based on its respective subset.

13. The wireless network deployment of claim 12, wherein the set of network factors comprises a first network factor and a second network factor, the first network factor having a higher priority than the second network factor in the network factor hierarchy.

14. The wireless network deployment of claim 13, wherein the configuration deployment ordering criteria specifies that respective values of the first network factor match for consecutive APs in the ordering of the set of APs and that respective values of the second network factor differ for consecutive APs in the ordering of the set of APs.

15. The wireless network deployment of claim 14, wherein the at least one processor is configured to determine the assignment that satisfies the configuration deployment ordering criteria by executing the machine-executable instructions to cause an assignment algorithm for determining the assignment to be iteratively executed.

16. The wireless network deployment of claim 12, wherein the at least one processor is further configured to execute the machine-executable instructions during the first iteration of the assignment algorithm to:
  determine that the second network factor is a next highest priority factor after the first network factor in the network factor hierarchy.

17. The wireless network deployment of claim 16, wherein the at least one processor is further configured to execute the machine-executable instructions during the first iteration of the assignment algorithm to:
  determine that one of a first assignment condition or a second assignment condition is satisfied, wherein the first assignment condition is the second subset comprising a single AP and the second assignment condition is the second subset comprising a plurality of APs; and
  responsive to the first assignment condition being satisfied, assign the single AP to a second position in the ordering of the set of APs, or
  responsive to the second assignment condition being satisfied:
    determine that all network factors in the set of network factors have been evaluated during the first iteration;
    assign a selected AP from the second subset to a second position adjacent to the first position in the ordering of the set of APs.

18. The wireless network deployment of claim 17, wherein the at least one processor is configured to execute the machine-executable instructions to select the AP from the second subset to assign to the second position in the ordering of the set of APs based on the selected AP being a first identified AP of the second subset that is not a neighbor AP to the first AP.

19. A non-transitory computer-readable medium storing computer-executable instructions that responsive to execution by a processor cause operations to be performed comprising:
  identifying a set of network factors associated with the set of APs comprising a first network factor and a second network factor;

selecting a first AP from the set of APs;

assigning the first AP to a first position in an ordering of the set of APs, wherein the ordering of the set of APs is representative of the deployment order for the set of configuration updates;

determining configuration deployment ordering criteria that specifies, based on a network factor hierarchy of the set of network factors, a relationship between respective sets of values of the set of network factors for consecutive APs in the ordering of the set of APs; and based on the configuration deployment ordering criteria, iterating through unassigned APs in the set of APs to identify a first subset of a plurality of APs that match a respective value of the first network factor for the first AP;

based on the configuration deployment ordering criteria, iterating through the first subset to identify a second subset of one or more APs having respective values of the second network factor that differ from the first AP; and iteratively executing an assignment algorithm to determine an assignment of each unassigned AP in the set of APs to a respective position in the ordering of the set of APs based on its respective subset.

20. The non-transitory computer-readable medium of claim 19, the operations further comprising:

modifying the ordering of the set of APs based on batching criteria, the modifying comprising:

determining that a high risk configuration update is to be deployed to a particular AP in the ordering;

determining that a neighbor AP to the particular AP is within a predetermined number of positions from the particular AP in the ordering; and modifying a respective position of one of the particular AP or the neighbor AP in the ordering to increase a number of positions between the particular AP and the neighbor AP in the ordering.

\* \* \* \* \*